United States Patent
Shah et al.

(10) Patent No.: US 11,488,066 B2
(45) Date of Patent: Nov. 1, 2022

(54) EFFICIENT CONVOLUTION OF MULTI-CHANNEL INPUT SAMPLES WITH MULTIPLE KERNELS

(71) Applicant: SiMa Technologies, Inc., San Jose, CA (US)

(72) Inventors: Nishit Shah, Sunnyvale, CA (US); Srivathsa Dhruvanarayan, Saratoga, CA (US)

(73) Assignee: SiMa Technologies, Inc., San Jose, CA (US)

( * ) Notice: Subject to any disclaimer, the term of this patent is extended or adjusted under 35 U.S.C. 154(b) by 375 days.

(21) Appl. No.: 16/854,803

(22) Filed: Apr. 21, 2020

(65) Prior Publication Data
US 2021/0326750 A1      Oct. 21, 2021

(51) Int. Cl.
*G06N 20/00*        (2019.01)
*G06N 3/08*         (2006.01)
*G06N 20/10*        (2019.01)

(52) U.S. Cl.
CPC ............... *G06N 20/00* (2019.01); *G06N 3/08* (2013.01); *G06N 20/10* (2019.01)

(58) Field of Classification Search
CPC ........... G06N 20/00; G06N 20/10; G06N 3/08
USPC ................................................... 706/12–45
See application file for complete search history.

(56) References Cited

U.S. PATENT DOCUMENTS

| | | | |
|---|---|---|---|
| 6,707,463 B1* | 3/2004 | Gibson | G06F 9/3879 |
| | | | 712/E9.067 |
| 7,234,645 B2* | 6/2007 | Silverbrook | G06T 1/20 |
| | | | 235/494 |
| 7,788,193 B2* | 8/2010 | Bartlett | G06V 10/761 |
| | | | 706/14 |
| 7,873,812 B1* | 1/2011 | Mimar | G06F 9/30109 |
| | | | 712/7 |
| 9,721,203 B1* | 8/2017 | Young | G06N 3/08 |
| 9,928,460 B1* | 3/2018 | Nowatzyk | G06N 3/04 |
| 10,373,050 B2* | 8/2019 | Lin | G06V 10/82 |
| 10,891,538 B2* | 1/2021 | Dally | G06N 3/063 |

(Continued)

OTHER PUBLICATIONS

Coutts et al, "Memory and Complexity Reduction in Parahermitian Matrix Manipulations of PEVD Algorithms", IEEE, pp. 1633-1637 (Year: 2016).*

(Continued)

*Primary Examiner* — Anil Khatri
(74) *Attorney, Agent, or Firm* — Fenwick & West LLP

(57) ABSTRACT

Convolutions of an input sample with multiple kernels is decomposed into matrix multiplications of a V×C matrix of input values times a C×K matrix of kernel values, producing a V×K product. For the second matrix, C is a channel dimension (i.e., each row of the second matrix is a different channel of the input sample and kernel) and K is the kernel dimension (i.e., each column of the second matrix is a different kernel), but all the values correspond to the same pixel position in the kernel. In the matrix product, V is the output dimension and K is the kernel dimension. Thus, each value in the output matrix is a partial product for a certain output pixel and kernel, and the matrix multiplication parallelizes the convolutions by calculating partial products for multiple output pixels and multiple kernels.

20 Claims, 20 Drawing Sheets

(56) References Cited

U.S. PATENT DOCUMENTS 10,997,772 B1 * 5/2021 Apodaca .............. G06F 8/658
11,144,291 B1 * 10/2021 Zheng ................ G06F 8/4441

OTHER PUBLICATIONS

Holobar et al, "Multichannel Blind Source Separation Using Convolution Kernel Compensation", IEEE, pp. 4487-4496 (Year: 2007).*
Becchi et al, "Data-Aware Scheduling of Legacy Kernels on Heterogeneous Platforms with Distributed Memory", ACM, pp. 82-91 (Year: 2010).*
Liu et al, "PuDianNao: A Polyvalent Machine Learning Accelerator", ACM, pp. 369-381 (Year: 2015).*
Srivastva et al, "PROMISE: An End-to-End Design of a Programmable Mixed-Signal Accelerator for Machine-Learning Algorithms", IEEE, pp. 43-56 (Year: 2018).*

* cited by examiner

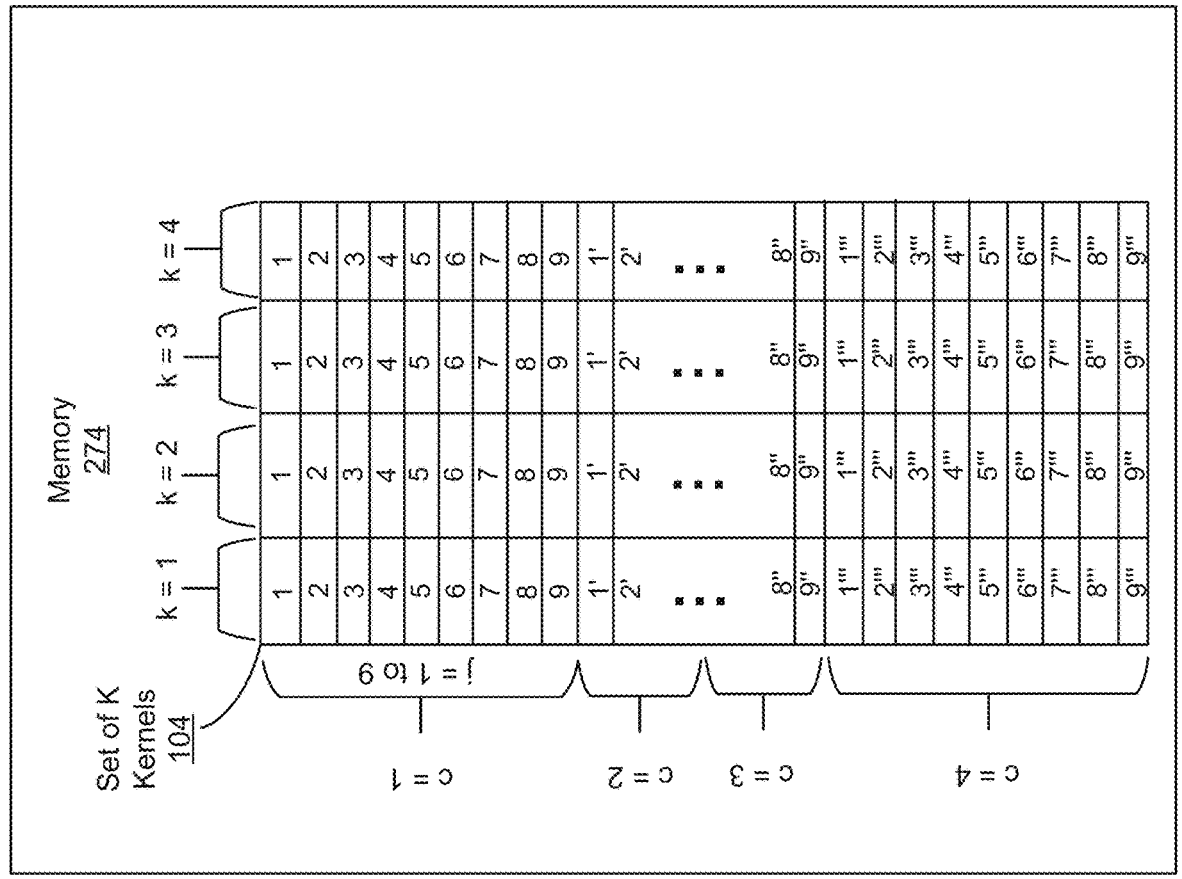
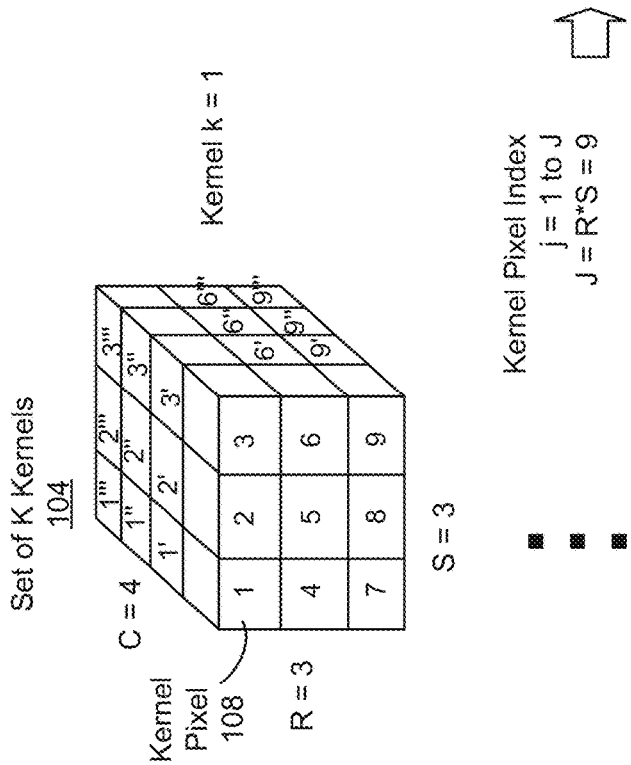
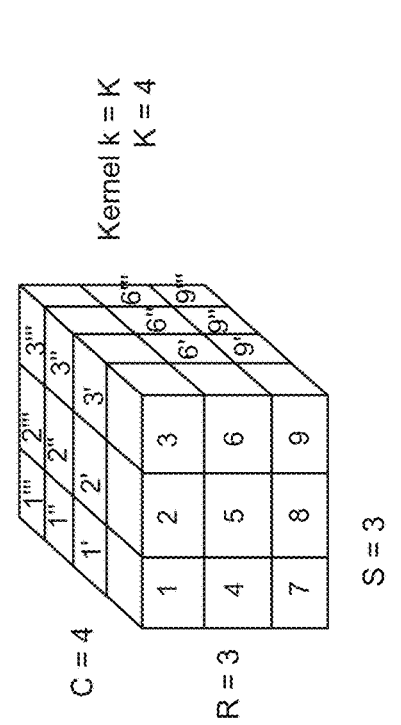
FIG. 2C

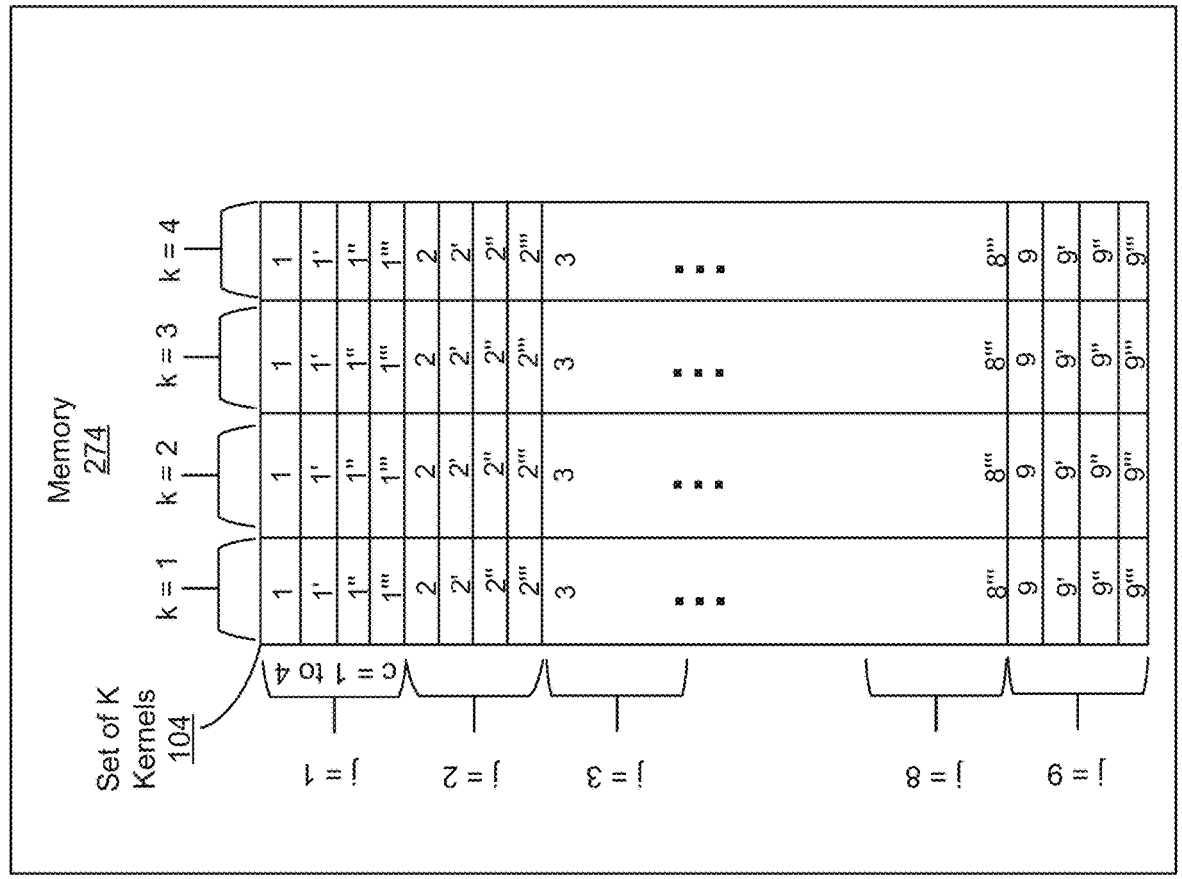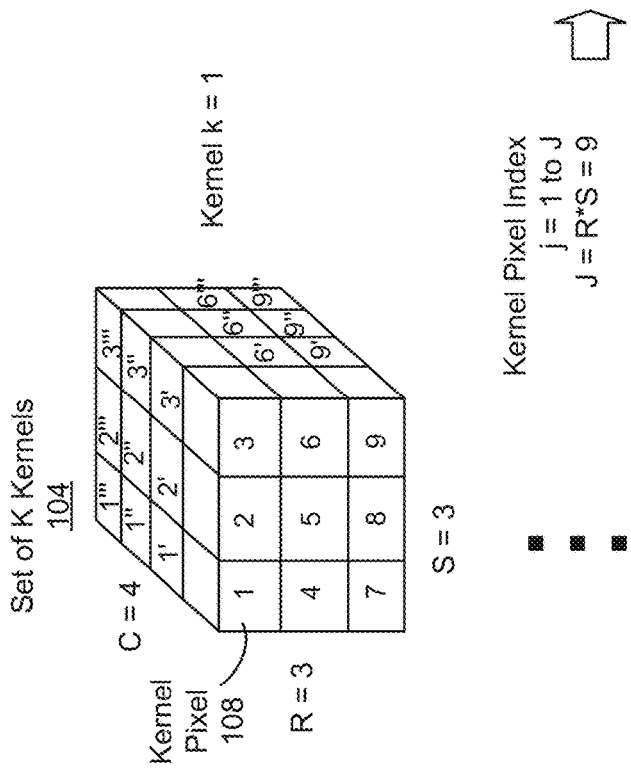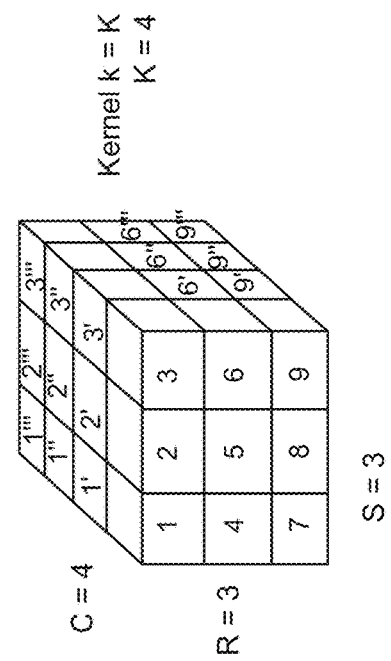
FIG. 2D

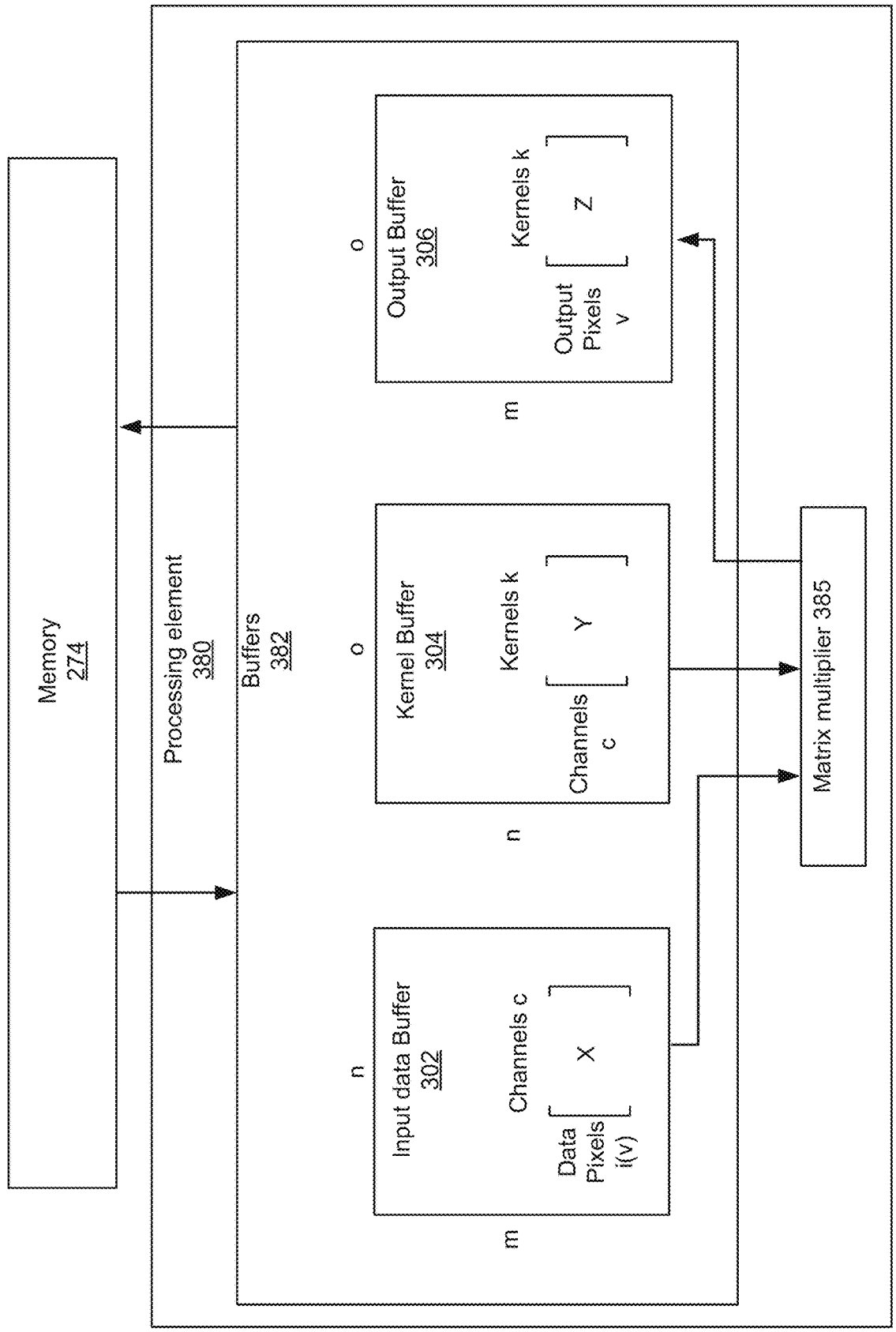

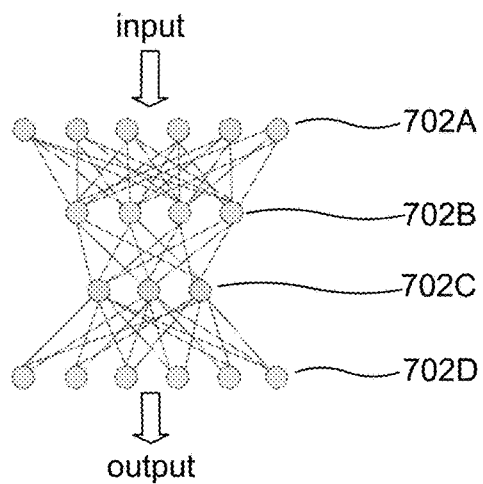
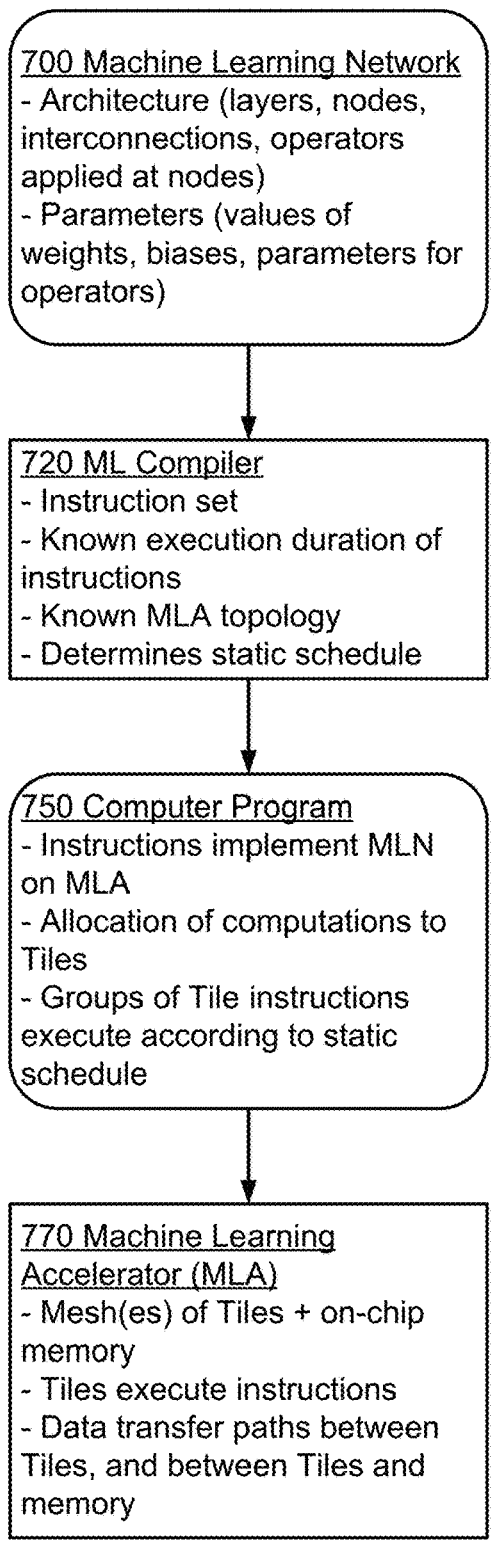
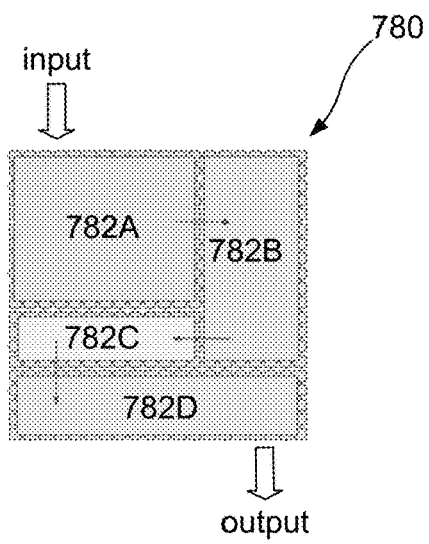
FIG. 7A

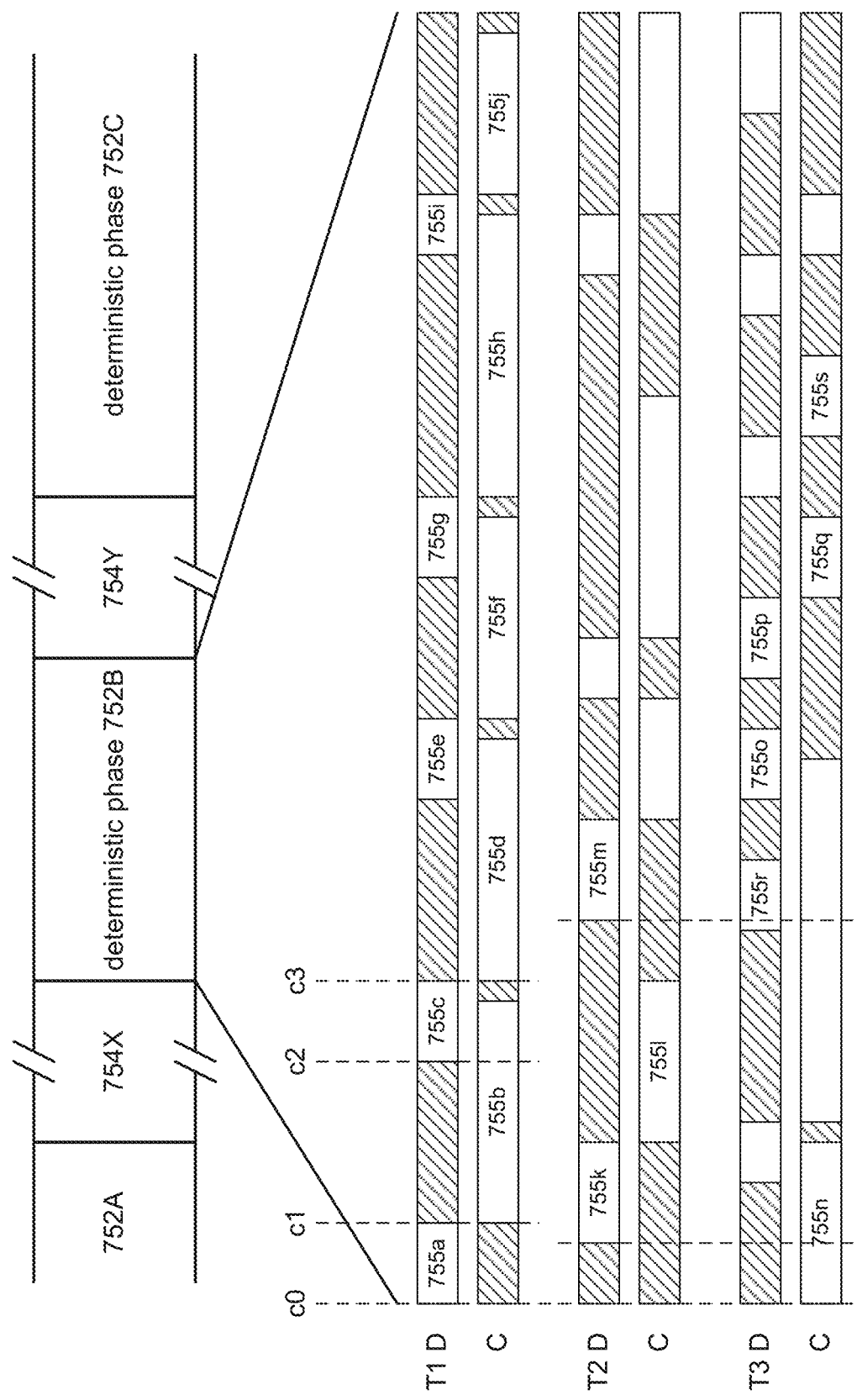

EFFICIENT CONVOLUTION OF MULTI-CHANNEL INPUT SAMPLES WITH MULTIPLE KERNELS

BACKGROUND

1. Technical Field

This disclosure relates generally to the implementation of convolutions on hardware, such as may be used in machine learning networks.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require the handling of a large volume of data and the execution of a large number of computations, such as convolution operations. As a result, they are commonly implemented in compute facilities with access to significant resources, such as in the cloud or on server clusters. However, the sources of input to machine learning networks may be located remotely from these compute facilities. For example, cameras and other types of sensors may be located on the edge of the network. Thus, one common paradigm is for the input sources to be web-based so that they can continuously send their captured data to the cloud-based compute facility, which then executes the machine learning network and returns the result.

There can be many advantages if the machine learning network was instead embedded on edge devices, such as combined with the camera system. However, edge devices typically are more limited in resources. Therefore, it is beneficial if operations such as convolutions can be implemented in a manner that reduces data transfer, memory usage, overall computations and data redundancy. These will also be beneficial for convolutions implemented outside of edge devices.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 2C illustrates a mapping of the set of K kernels to the memory.

FIG. 2D illustrates an alternate mapping of the set of K kernels to the memory.

FIG. 3 illustrates a mapping of a memory to buffers of a matrix multiplier.

FIG. 7A is a block diagram of a machine learning accelerator (MLA) and corresponding compiler.

FIG. 7B illustrates partitioning a computer program into deterministic and non-deterministic phases.

DETAILED DESCRIPTION OF THE PREFERRED EMBODIMENTS

Figure 1:
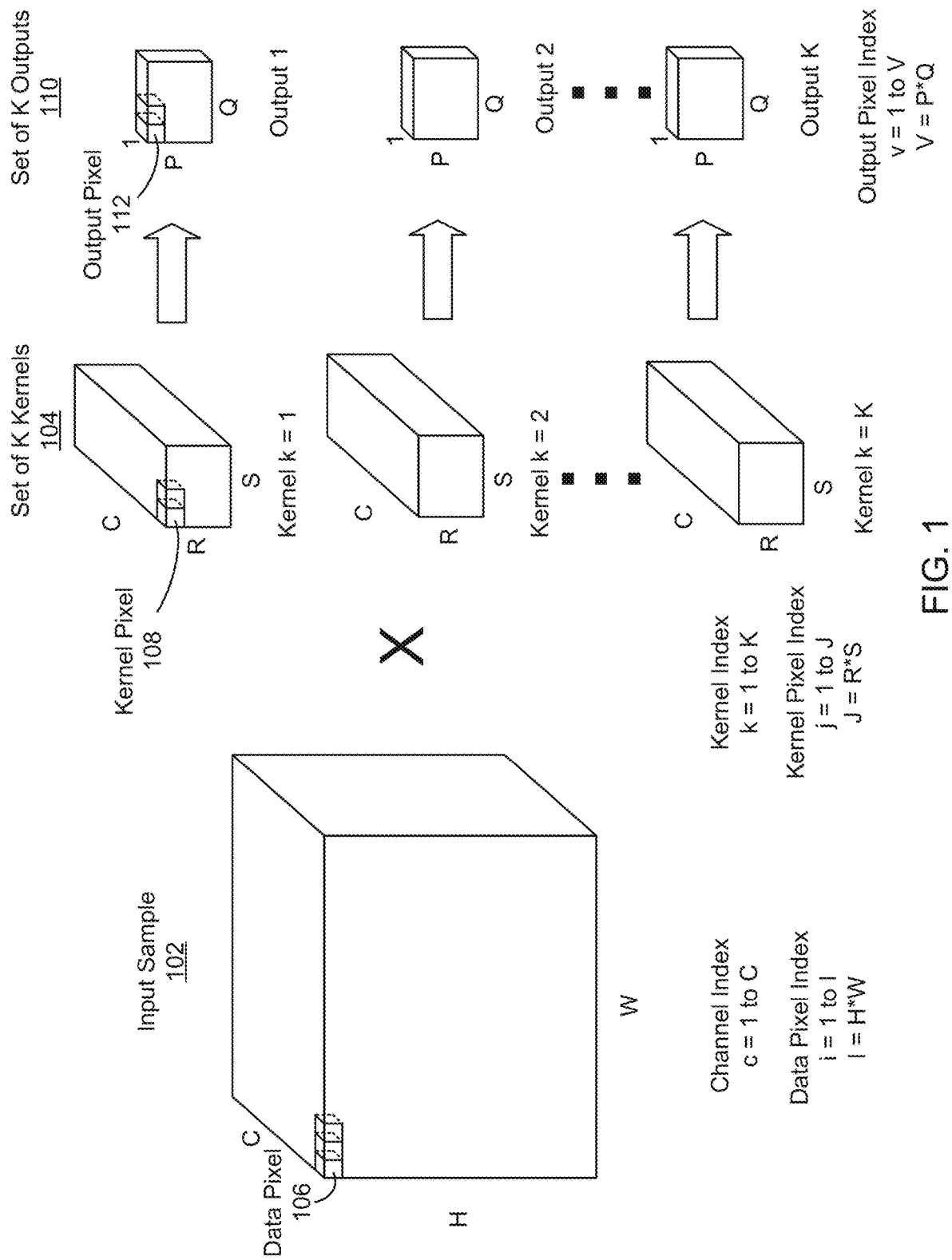
FIG. 1 illustrates an input sample and a set of K kernels for convolution operations to produce a set of K outputs.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In convolution, an input sample is convolved with a kernel to produce an output. For each output pixel, the kernel is shifted by a certain amount (as defined by the stride of the convolution), and a dot product of the shifted kernel and the corresponding input pixels is calculated. This is repeated for different amounts of shift to produce the entire output. Because of the structure of the convolution operation, convolution may be implemented using matrix multipliers since, in matrix multiplication, each value in the output matrix is a dot product between a row and a corresponding column of the two input matrices.

For any convolution, the number of scalar multiplications required to compute the convolution is fixed. However, there can be a large amount of data involved between the input sample and the kernel. Therefore, the efficiency for computing a convolution will depend in part on whether data transfer, memory usage, computations and data redundancy are efficiently managed.

The data of the input sample and kernel may have one or many channels. For example, if the input sample is an image, it may have a red channel, a green channel and a blue channel. The kernel would also have a corresponding red channel, green channel and blue channel. The channel is a dimension that is common to both the input sample and the kernel and the convolution sums over the channel dimension. The same input sample may also be convolved with multiple different kernels. For example, the image may be convolved with kernels designed for different purposes: detections of edges of different orientations, point detection, smoothing etc. In the interior layers of a machine learning network, the input samples may be very large, with many channels, and convolved with many kernels.

In the approach described in more detail below, the convolutions of an input sample with multiple kernels is decomposed into matrix multiplications of an m×n matrix of input values times an n×o matrix of kernel values, producing an m×o product. For convenience, these matrices will be referred to as X (input matrix), Y (kernel matrix) and Z (output matrix or partial product matrix). For the n×o Y (kernel) matrix, n is the channel dimension (i.e., each row of the Y is a different channel) and o is the kernel dimension (i.e., each column of Y is a different kernel), but all the values correspond to the same kernel pixel position. That is, the values in the Y matrix may all represent kernel(1,1) for different channels and different kernels, but the (1,1) part is fixed. In the m×o Z matrix product, m is the output dimension and o is the kernel dimension. Thus, each value in the output matrix Z is a partial product for a certain output pixel and kernel. It is a partial product because Z represents the contribution from only one of the pixels in the kernel (e.g., from the (1,1) pixel). Z matrices for all the other pixels in the kernel are also computed and accumulated to produce the full output values. In the m×n X input matrix then, m (each row of the first matrix) represents pixels in the input sample that contribute to the corresponding output pixels of the convolution, for a fixed pixel within the convolution kernel. n is the channel dimension.

This approach is advantageous because, for common formats for storing input samples and kernels in memory, this approach reduces data manipulations (e.g., reordering or transposing data for the matrix multiplication hardware) and also reduces data duplication (e.g., storing the same input pixels multiple times). For example, the IM2COL (Image to Column) operation is commonly used in conventional implementations of convolution, but it requires reordering and duplication of input pixels, which are avoided by this approach. This is because the matrix multiplication enables parallel convolutions with respect to the output value and the kernel. That is, the matrix multiplication calculates partial products for multiple output pixels and for multiple kernels, but for only one pixel within the kernel. The entire kernel is accounted for by performing matrix multiplications for each of the pixels within the kernel and accumulating the partial products. As a result, this approach may accommodate kernels of different sizes by changing the number of matrix multiplications that are performed, while still maintaining the inherent efficiency of this approach.

This approach and its advantages will be explained in more detail below. FIG. 1 introduces some nomenclature and an example of the convolution of an input sample with multiple kernels. FIG. 2 illustrates a common format for storing the input sample and the kernels in memory. FIG. 3 illustrates a hardware matrix multiplier, including the arrangement of data within the buffers that provide input to the matrix multiplier. FIGS. 2 and 3 show some advantages of this approach for reducing data manipulations. FIGS. 4 and 5 walk through the first two matrix multiplications of an example, further illustrating advantages of this approach.

FIG. 1 illustrates an input sample 102 and a set of K kernels 104 for convolution operations to produce a set of K outputs 110. The input sample 102 is convolved with each of the set of K kernels 104 to produce a respective output of the set of K outputs 110.

The input sample 102 includes a block of data pixels 106 (aka input pixels) defining H pixel values in height, W pixel values in width, and C channels in depth. For each channel, the data pixels 106 may be referenced by a data pixel index i defined from 1 to I, where I is equal to H*W. That is, i is an ordering of the H×W dimensions. The channels are referenced by a channel index c defined from 1 to C. Data pixels of corresponding position across the C channels have the same data pixel index i value. In the following examples, the input sample 102 has two pixel dimensions H×W with multiple channels but, in other situations, the input sample may have other numbers of dimensions (i.e., one dimension or higher dimension tensors).

Each kernel of the set of K kernels 104 includes a block of kernel pixels 108 defining R pixel values in height, S pixel values in width, and the C channels in depth. The kernels of the set of K kernels are referenced by a kernel index k defined from 1 to K. For each channel of a kernel, the kernel pixels 108 are referenced by a kernel pixel index j defined from 1 to J, where J=R*S. The kernel pixel index j is an ordering of the R×S dimensions. Each kernel typically includes the same number of channels C as the input sample 102. Zero padding may be used to achieve this. Kernel pixels of corresponding position across the K kernels and C channels have the same kernel pixel index j value. The kernel also is not constrained to have only two pixel dimensions R×S. Similarly, for both the input samples and the kernels, the channels may be multi-dimensional. The channel index c is an ordering of the channels, regardless of the number of dimensions.

Each output of the set of K outputs 110 includes output pixels 112 defining P pixel values in height and Q pixel values in width. The output pixels of each of the K outputs are referenced by an output pixel index v defined from 1 to V, where V=P*Q. P and Q depend on H and W, R and S, and the stride of the convolution.

Figure 2A:
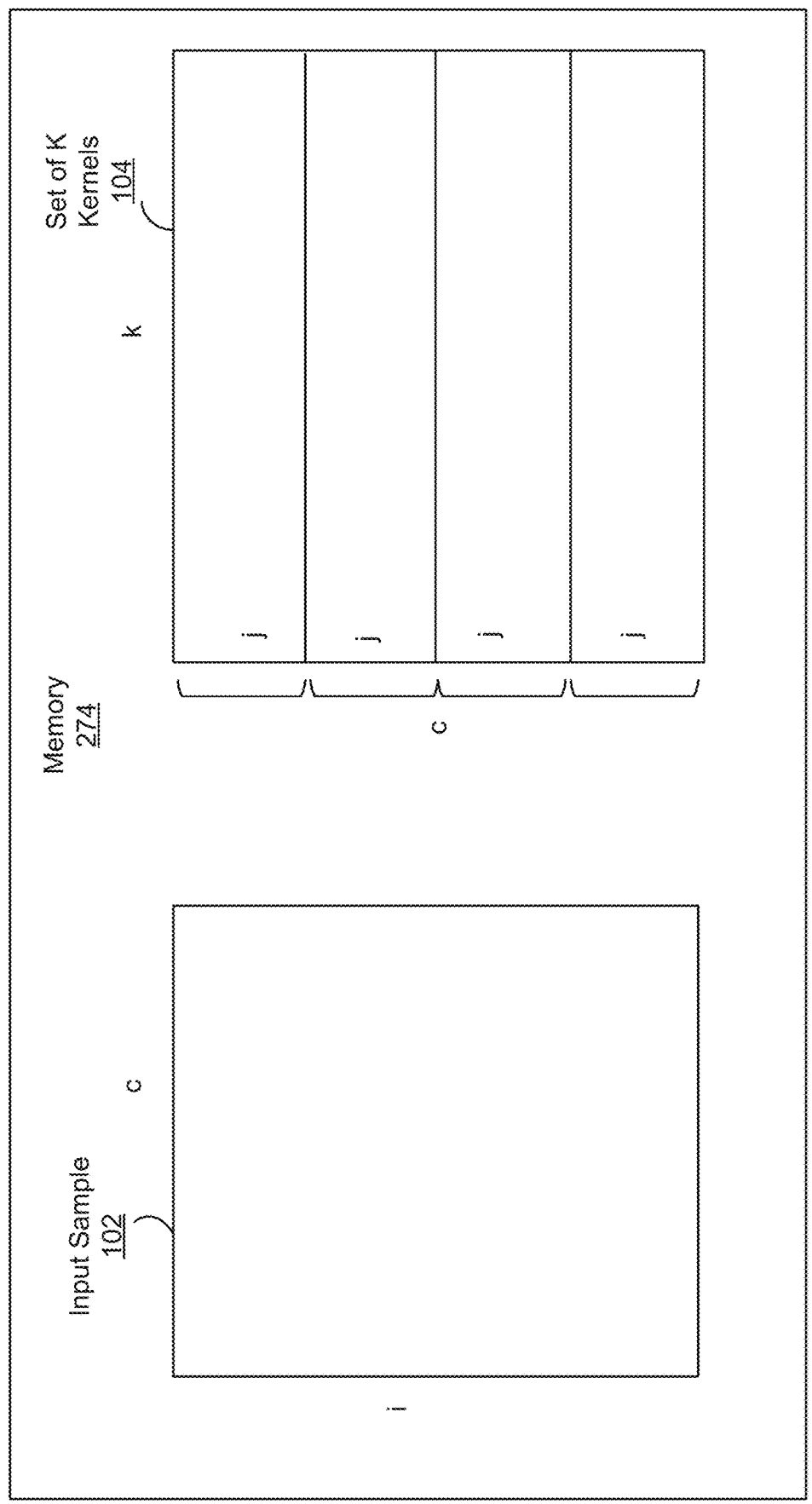
FIG. 2A illustrates the input sample and the set of K kernels stored in a memory.

FIG. 2A illustrates the input sample 102 and the set of K kernels 104 stored in a memory 274. The memory 274 may be a component of a machine learning accelerator (MLA) that executes the convolution operations using the input sample 102 and the set of K kernels 104. The memory 274 stores the input sample 102 and the set of K kernels 104 and provides selected values of the input sample 102 and selected values of the K kernels 104 to one or more processing elements (e.g., Tiles as described below) of the MLA for execution of matrix multiplications to implement the convolution operations.

The input sample 102 is stored in a first set of memory locations of the memory 274 defined by rows and columns. The data pixel index i is mapped to rows of the memory 274 and channel index c is mapped to columns of the memory 274. Thus, each column of the memory 274 stores data pixels for data pixel index i=1 to I, for a given value of channel index c. Analogously, each row of the memory 274 stores data pixels for a given value of pixel index i value and for channel index c=1 to C.

The set of K kernels 104 is stored in a second set of memory locations of the memory 274 defined by rows and columns. The kernel pixel index j and channel index c are both mapped to rows of the memory 274, where the kernel pixel index j is the inner dimension (cycling more quickly) and the channel index c is the outer dimension (cycling more slowly). In an alternate embodiment, the indices j and c may be swapped, so that the channel index c is the inner dimension and the kernel pixel index j is the outer dimension. The kernel index k is mapped to columns of the memory 274. Thus, each column of the memory 274 stores kernel pixels for kernel pixel index j=1 to J and for channel index c=1 to C, but for a given value of kernel index k. Each row of the memory 274 stores kernel pixels for a given value of kernel pixel index j and channel index c, but for kernel index k=1 to K.

Figure 2B:
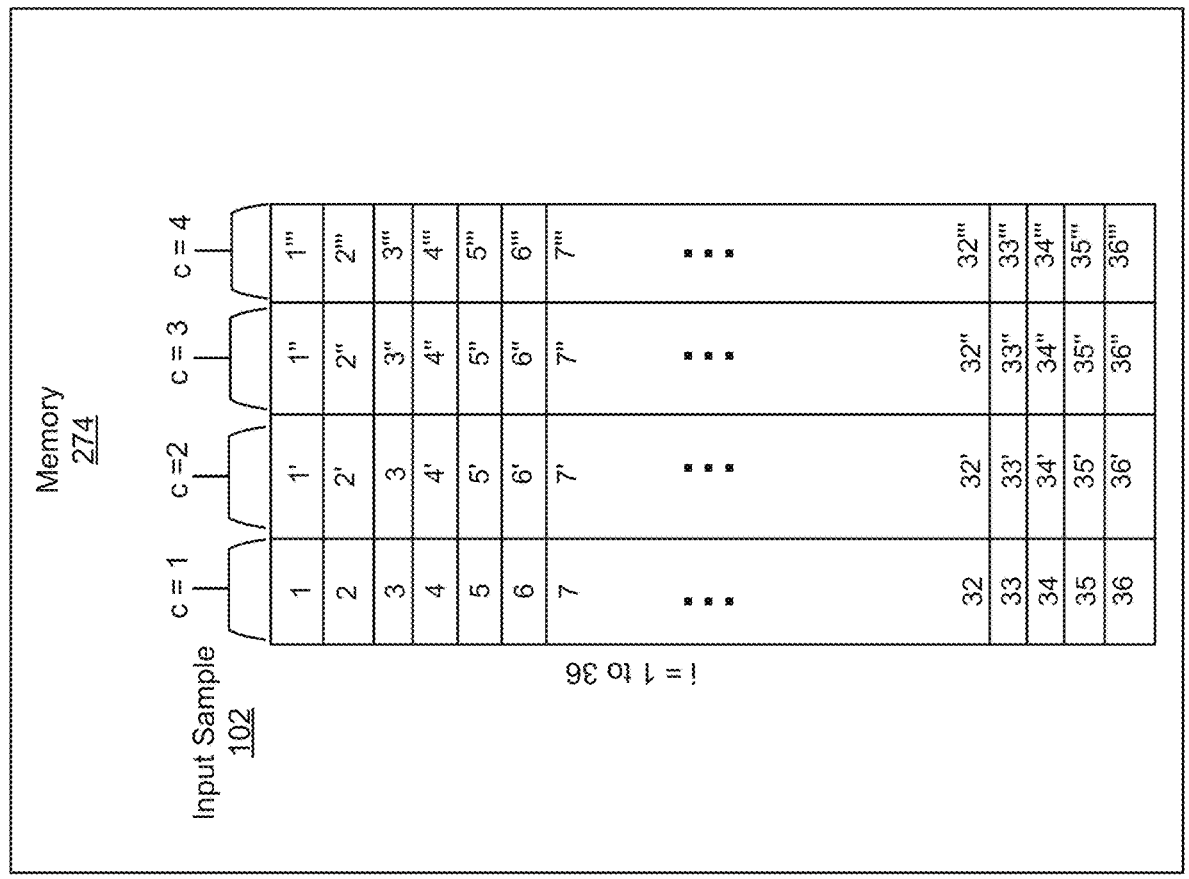
FIG. 2B illustrates a mapping of the input sample to the memory.

FIG. 2B illustrates a common format for storing an input sample 102 in the memory 274. In this example, the input sample 102 has H=6 pixel values in height, W=6 pixel values in width, and C=4 channels in depth. The data pixel index i is defined from 1 to I=H*W=36. Values of the data pixels 106 are numbered for each channel c using the data pixel index i, with data pixels for channel c=1 being numbered from 1 to 36, data pixels for channel c=2 being numbered from 1' to 36', data pixels for channel c=3 being numbered from 1" to 36", and data pixels for channel c=4 being numbered from 1'" to 36'".

Each column of the memory 274 includes data pixels of each pixel index i value from 1 to 36 for one of the channels c. The first column includes data pixels 1 to 36 (i.e., data pixel index i=1 to 36) for channel c=1, the second column includes data pixels 1' to 36' (also data pixel index i=1 to 36) for channel c=2, the third column includes data pixels 1" to 36" for channel c=4, and the fourth column includes data pixels 1'" to 36'" for channel c=4.

Each row of the memory 274 includes data pixels of one data pixel index i value for each channel index c value from 1 to 4. The first row includes data pixels of data pixel index i=1 for channels c=1 through 4, the second row includes data pixels of data pixel index i=2 for channels c=1 through 4, and so forth for each of the rows.

FIG. 2C illustrates a common format for storing the set of K kernels 104 to the memory 274. In this example, each kernel of the set of K kernels 104 has R=3 pixel values in height, S=3 pixel values in width, and C=4 channels in depth. The kernel pixel index j is defined from 1 to J=S*R=9. For each kernel, the values of the kernel pixels 108 are numbered for each channel c using the kernel pixel index j, with kernel pixels for channel c=1 being numbered from 1 to 9, kernel pixels for channel c=2 being numbered from 1' to 9', kernel pixels for channel c=3 being numbered from 1" to 9", and kernel pixels for channel c=4 being numbered from 1'" to 9'".

Each column of the memory 274 includes kernel pixels of kernel pixel index j=1 to 9 for each channel index c=1 to 4, for one kernel index k value. Each column for kernel k=1 to 4 includes kernel pixels numbered 1 to 9 for channel c=1, kernel pixels numbered 1' to 9' for channel c=2, kernel pixels numbered 1" to 9" for channel c=3, and kernel pixels numbered 1'" to 9'" for channel c=4.

Each row of the memory 274 includes kernel pixels for one kernel pixel index i and one channel index c, but for kernel index k=1 to 4. For example, the first row includes kernel pixels of kernel pixel index i=1 for channel c=1 for kernels k=1 to 4, the second row includes kernel pixels of kernel pixel index i=2 for channels c=1 for kernels k=1 to 4, and so forth for the channel c=1. The tenth row includes kernel pixels of kernel pixel index i=1 for channel c=2 for kernels k=1 to 4, the eleventh row includes kernel pixels of kernel pixel index i=1 for channel c=2 for kernels k=1 to 4, and so forth for each of the channels.

FIG. 2D shows an alternative to FIG. 2C. In FIG. 2C, the kernel pixel index j is the inner dimension (cycling more quickly) and the channel index c is the outer dimension (cycling more slowly). In FIG. 2D, the two are reversed. The channel index c is the inner dimension (cycling more quickly) and the kernel pixel index j is the outer dimension (cycling more slowly). FIG. 2C will be used for the rest of this disclosure, but the principles shown may also be used with the storage format of FIG. 2D or other storage formats.

As will be shown in FIGS. 4 and 5, the matrix multipliers use the data in the same format as shown in FIGS. 2B and 2C. That is, each column is a different channel. This is advantageous because reordering of the data is not required. In contrast, conventional techniques for implementing convolution typically flatten the data shown. That is, the data for all channels are contained in the same column, but this requires an extra step to reorder the data before it is used by the matrix multipliers.

FIG. 3 illustrates a mapping from memory 274 to buffers 382 of a processing element 380 that performs matrix multiplication 385. The buffers 382 receive pixels values from the memory 274 and provide these values to the hardware matrix multiplier 385. The matrix multiplier 385 may be a systolic array. The buffers 382 include an input data buffer 302, a kernel buffer 304, and an output buffer 306. These are shown as separate buffers for purposes of illustration, but they may or may not be implemented as separate buffers in hardware.

The input data buffer 302 receives data pixels of the input sample 102 from the memory 274 and stores an X matrix of m×n data pixels for matrix multiplication by the matrix multiplier 385. In some embodiments matrix multiplier 385 may be implemented as a systolic array which has an m×o array of multipliers arranged in m rows and o columns. In other embodiments, matrix multiplier 385 may be implemented as SIMD multipliers which can be pipelined. The input data buffer 302 includes m rows and n columns to store the X matrix of data pixels. The kernel data buffer 304 receives kernel pixels of the set of K kernels 104 from the memory 274 and stores a Y matrix of n×o kernel pixels for the matrix multiplication. The kernel data buffer 304 includes n rows and o columns to store the Y matrix of kernel pixels.

Data pixels of the input sample 102 are mapped to the input buffer 302 as follows. The channel index c is mapped to the n columns of the memory input buffer 302. The data pixel index i is mapped to the m rows of the input buffer 302, according to which indices i are required to calculate the corresponding output pixels v in the output matrix Z. An example will be given in FIGS. 4-5. For both the memory 274 and the input buffer 302, each column is a different channel (but preferably the same channel for both memory 274 and input buffer 302) and each row is a different data pixel (and the mapping of data pixels from memory 274 to input buffer 302 is defined by the output pixel indices v). That is, values from a row of memory 274 are also stored in a row in input buffer 302 (rather than as a column for example). As such, the selected values of the input sample 102 can be retrieved from the memory 274 and stored in the input data buffer 302 as the X matrix without transposing the data pixels.

The data pixels of the input sample 102 are selected from the memory 274 to the input data buffer 302 also based on stride values for the convolution. For example, a stride $S_W$ may be defined along the width dimension W and a stride $S_H$ may be defined along the height dimension H of the input sample 102. When the selected values of the input sample 102 are retrieved from the memory 274 and stored in the input buffer 302, some of the data pixels of the input sample 102 stored in the memory 274 will be skipped based on the stride values. In the examples below, without loss of generality, the stride values are set to 1.

Similarly, selected kernel pixels of the set of K kernels 104 are mapped to the kernel buffer 304 with channel index c mapped to n rows of the kernel buffer 304 and kernel index k mapped to o columns of the kernel buffer 304. Similar to the input data, this format preserves the row format of the kernels stored in memory 274. Values from a row of memory 274 are also stored in a row in kernel buffer 304 (rather than as a column for example). As such, the selected values of the set of K kernels 104 can be retrieved from the memory 274 and stored in the kernel buffer 304 as the Y matrix without transposing the kernel pixels.

The circuitry 385 performs matrix multiplications using the X matrix stored in the input data buffer 302 and the Y matrix stored in the kernel buffer 304 to generate a Z matrix of output pixels. Note that there is no kernel pixel index j in the matrix Y. The values in matrix Y are for a given value of the kernel pixel index j. The matrix Z is thus a calculation for just a single kernel pixel index j. It is a partial product since the contributions from all kernel pixels j must be summed to get the full product. In one approach, a running sum is held in the output buffer 306 and, on each loop, an additional partial product matrix Z is accumulated for a different kernel pixel index j until the entire kernel is accounted for. The full output may then be output. This approach is advantageous because it reduces the data manipulation and data redundancy, as will be shown in FIGS. 4 and 5 below.

The values m, n, and o of the input buffer 302 and kernel buffer 304 may each be a power of 2. To achieve efficient convolution operation cycles, the total number of channels C is preferably an integer multiple of n, the total number of data pixels I in the input sample 102 is preferably an integer multiple of m, and the total number of kernels K is preferably an integer multiple of o. In some embodiments, m=n=o. Here, the input data buffer 302 and kernel buffer 304 store respective square X and Y matrices of the same size which are matrix multiplied in each cycle to produce a square Z matrix of the same size.

Figure 4A:
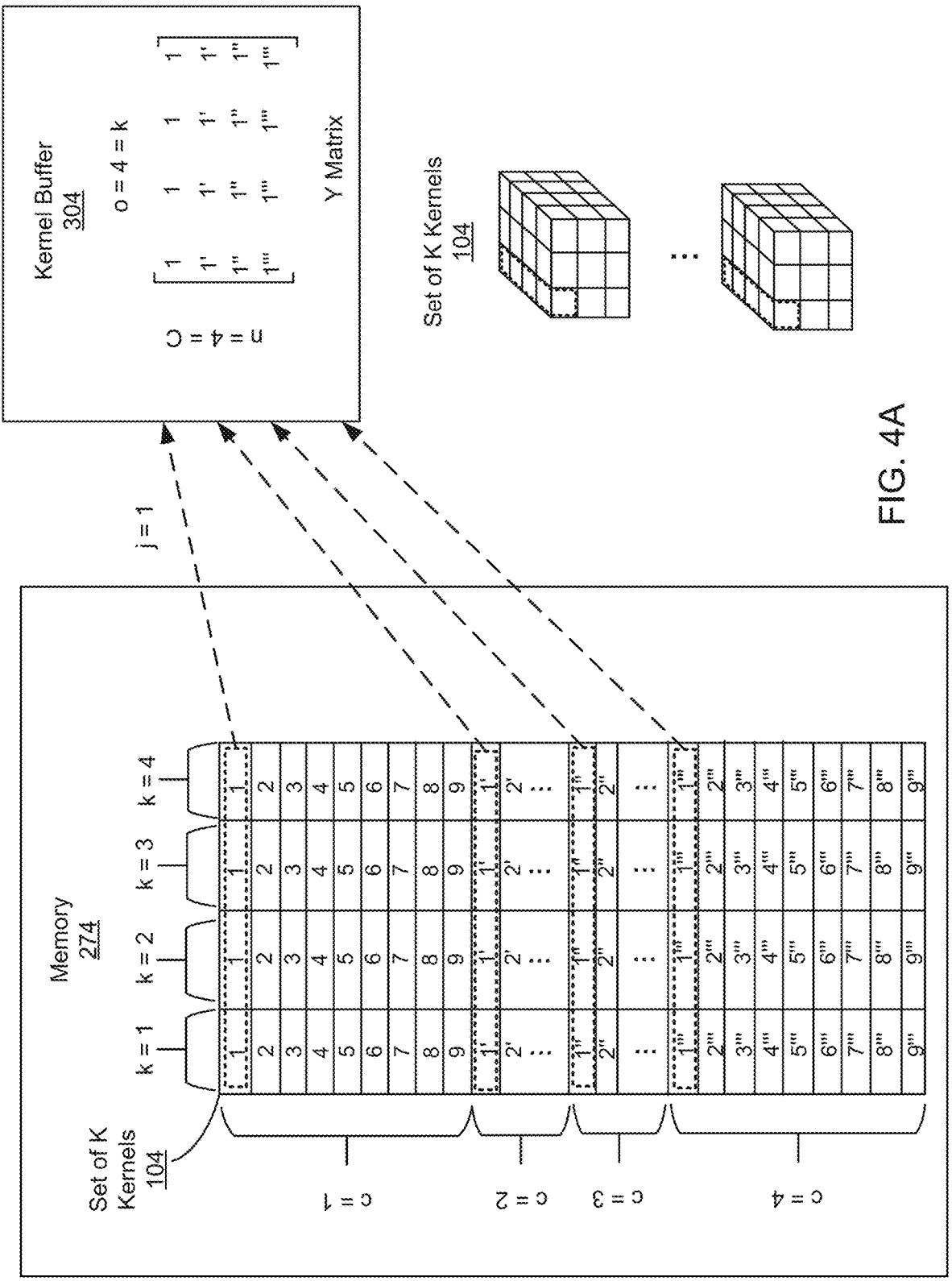
FIGS. 4A and 4B illustrate a mapping of kernel pixels to a kernel buffer, and a mapping of data pixels to an input data buffer, for matrix multiplication #1 shown in FIG. 4C.
Figure 4B:
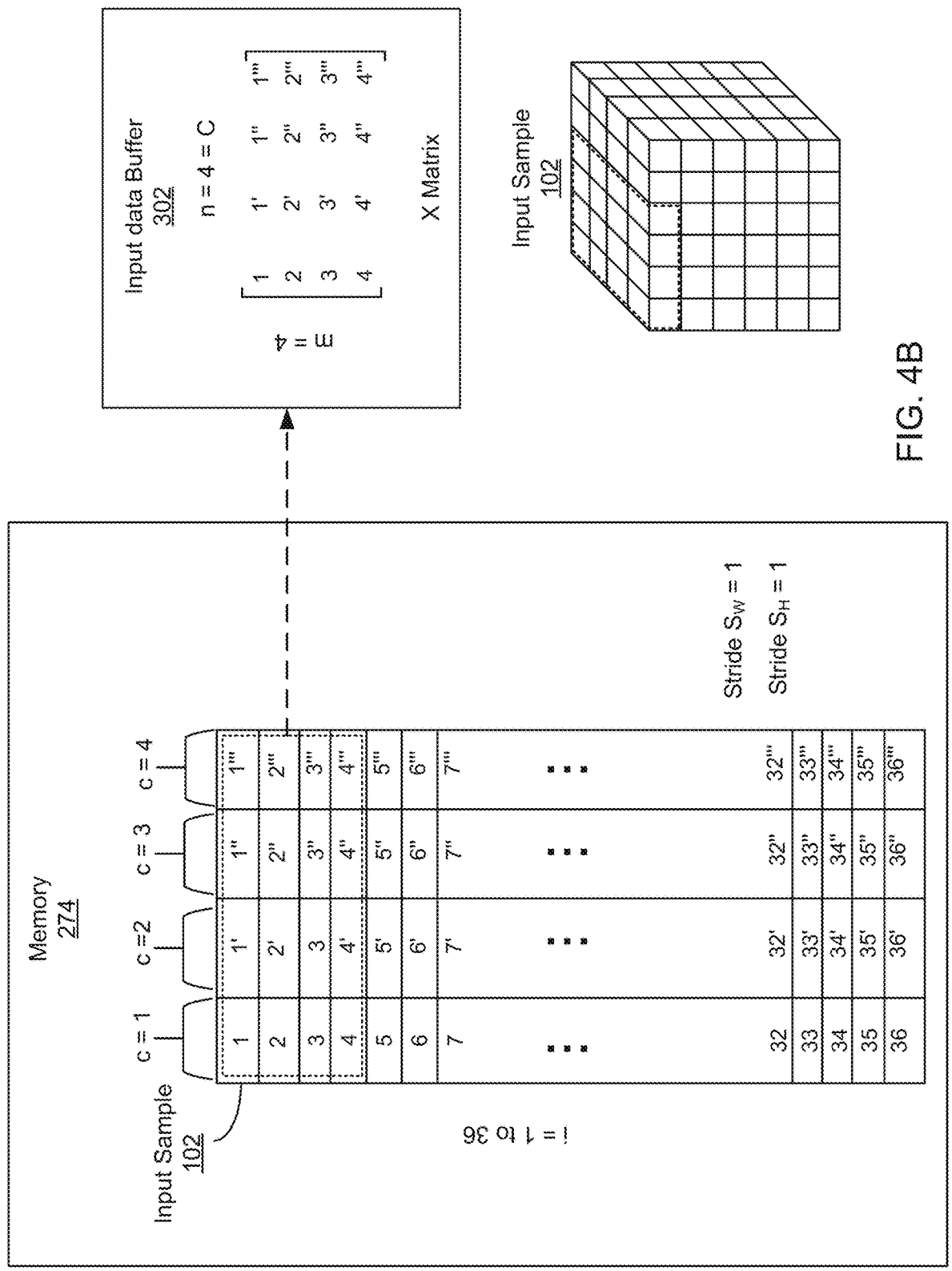
Figure 4C:
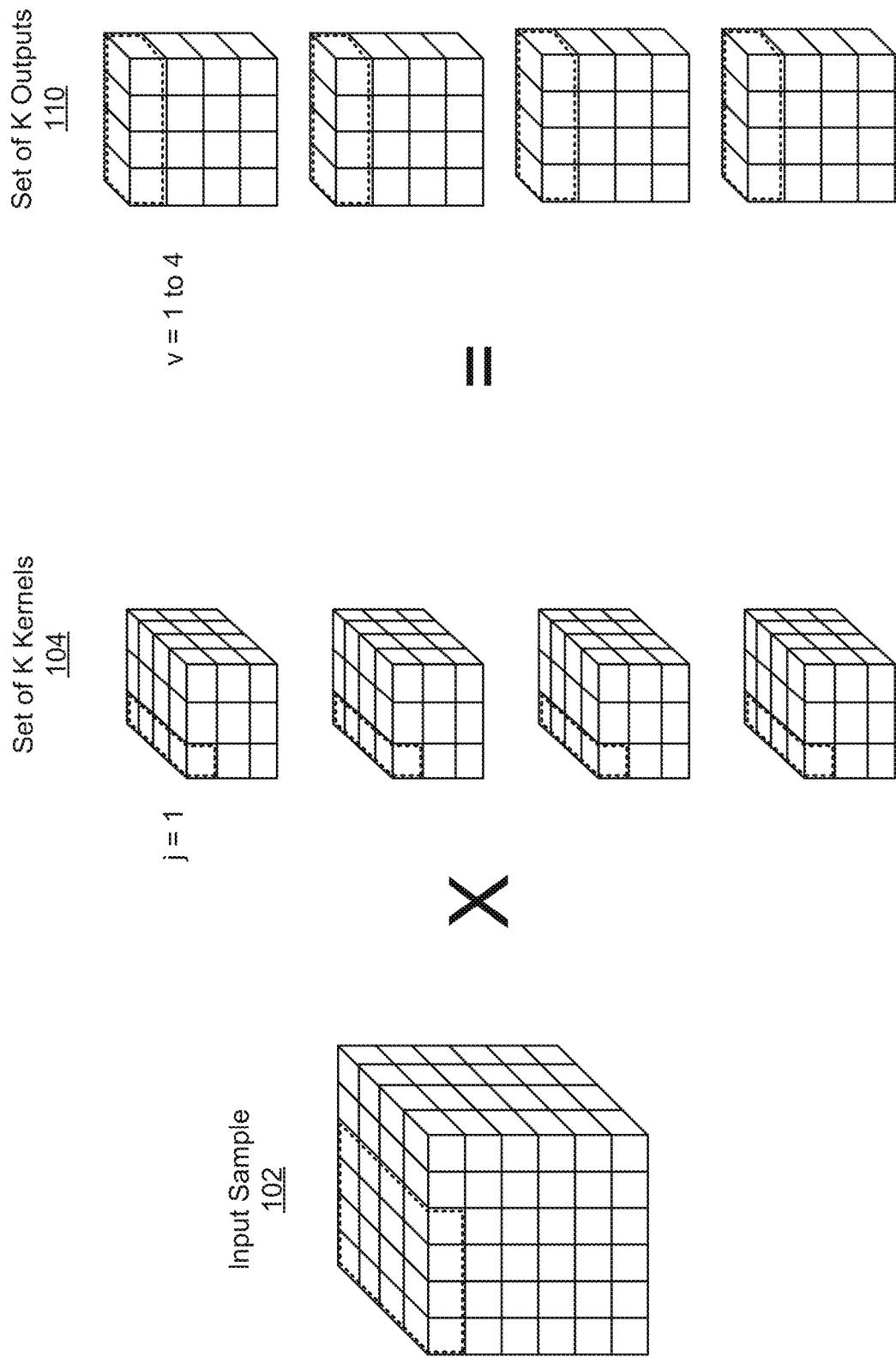
Figure 5A:
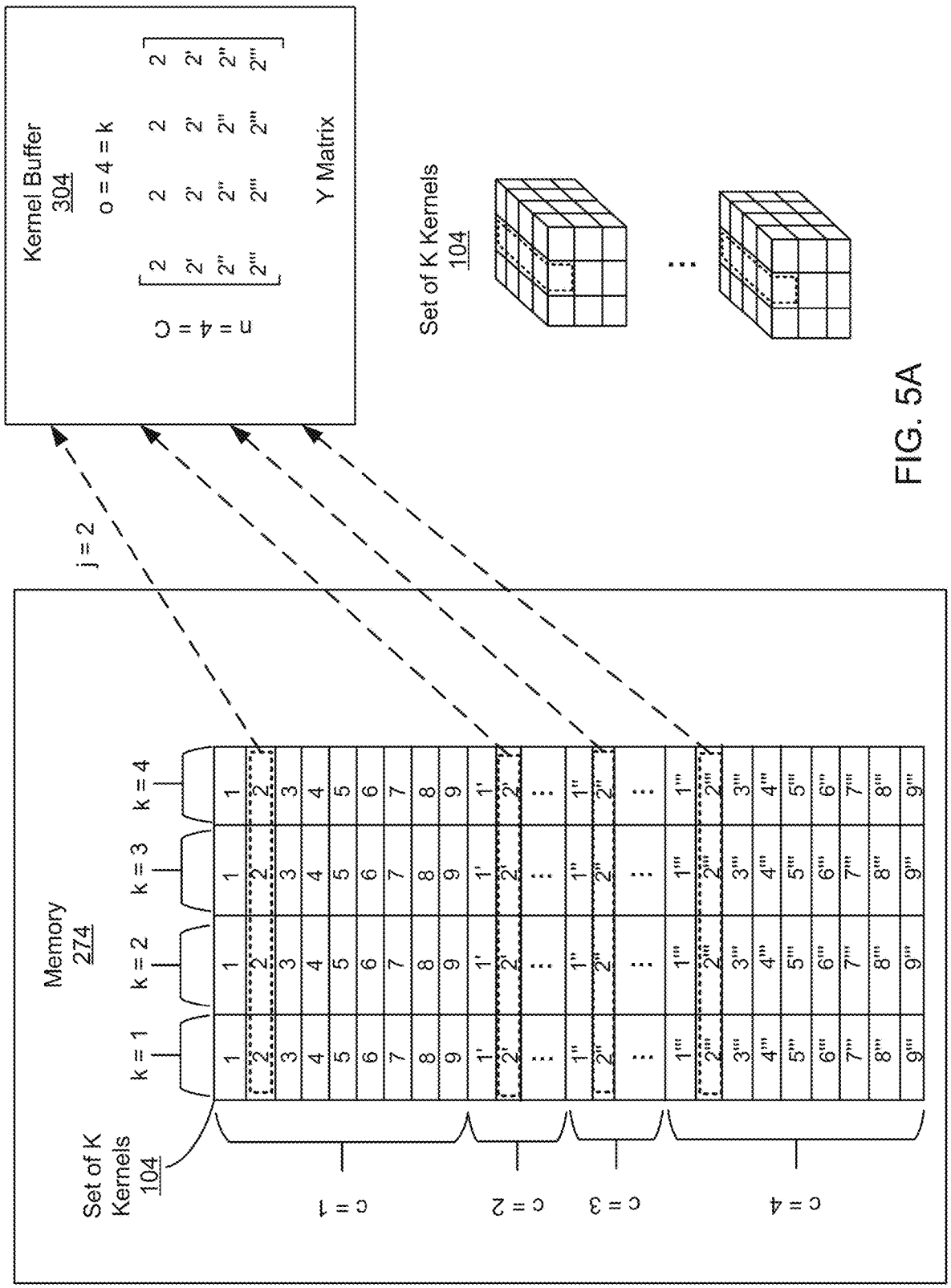
FIGS. 5A and 5B illustrate a mapping of kernel pixels to a kernel buffer, and a mapping of data pixels to an input data buffer, for matrix multiplication #2 shown in FIG. 5C.
Figure 5B:
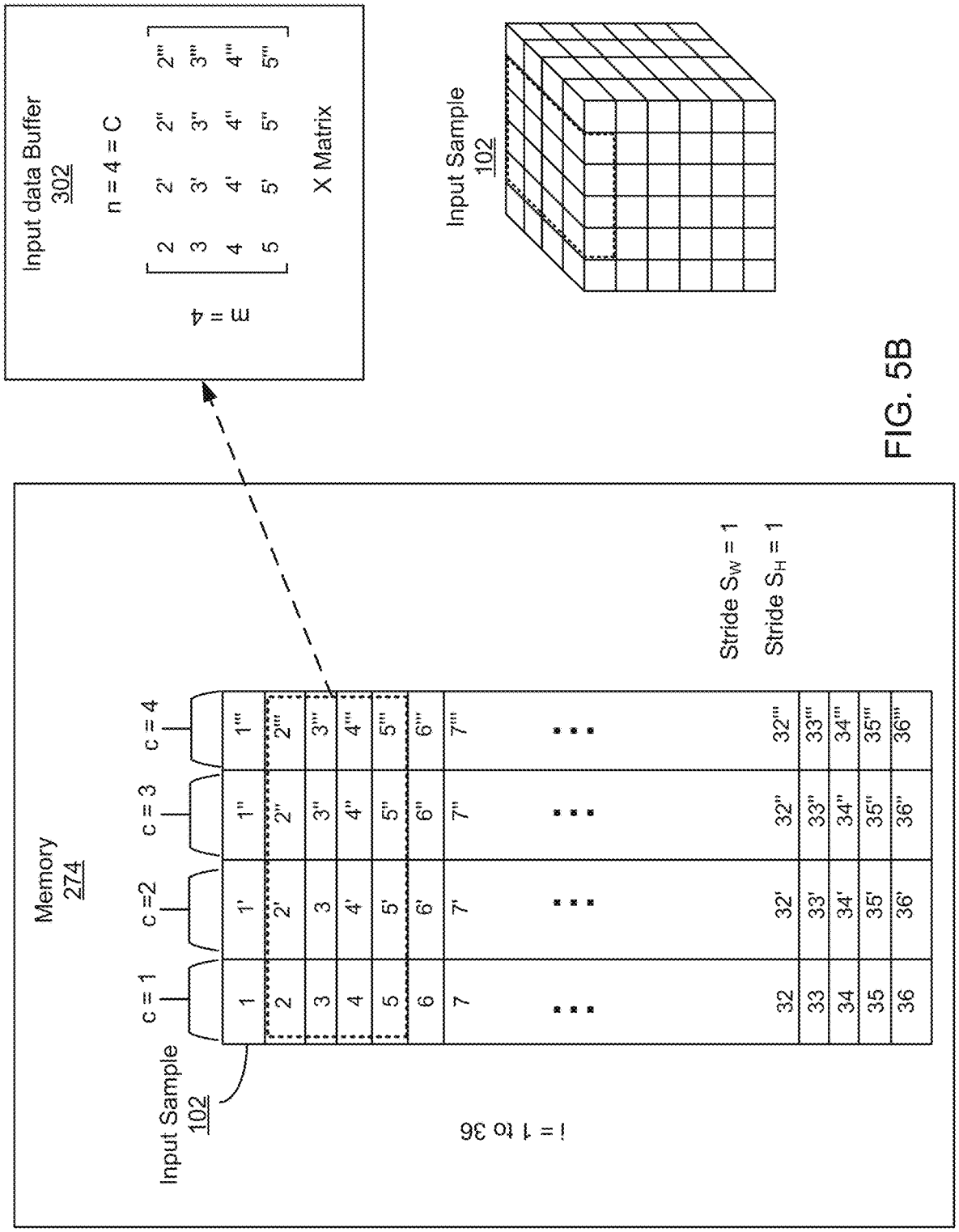
Figure 5C:
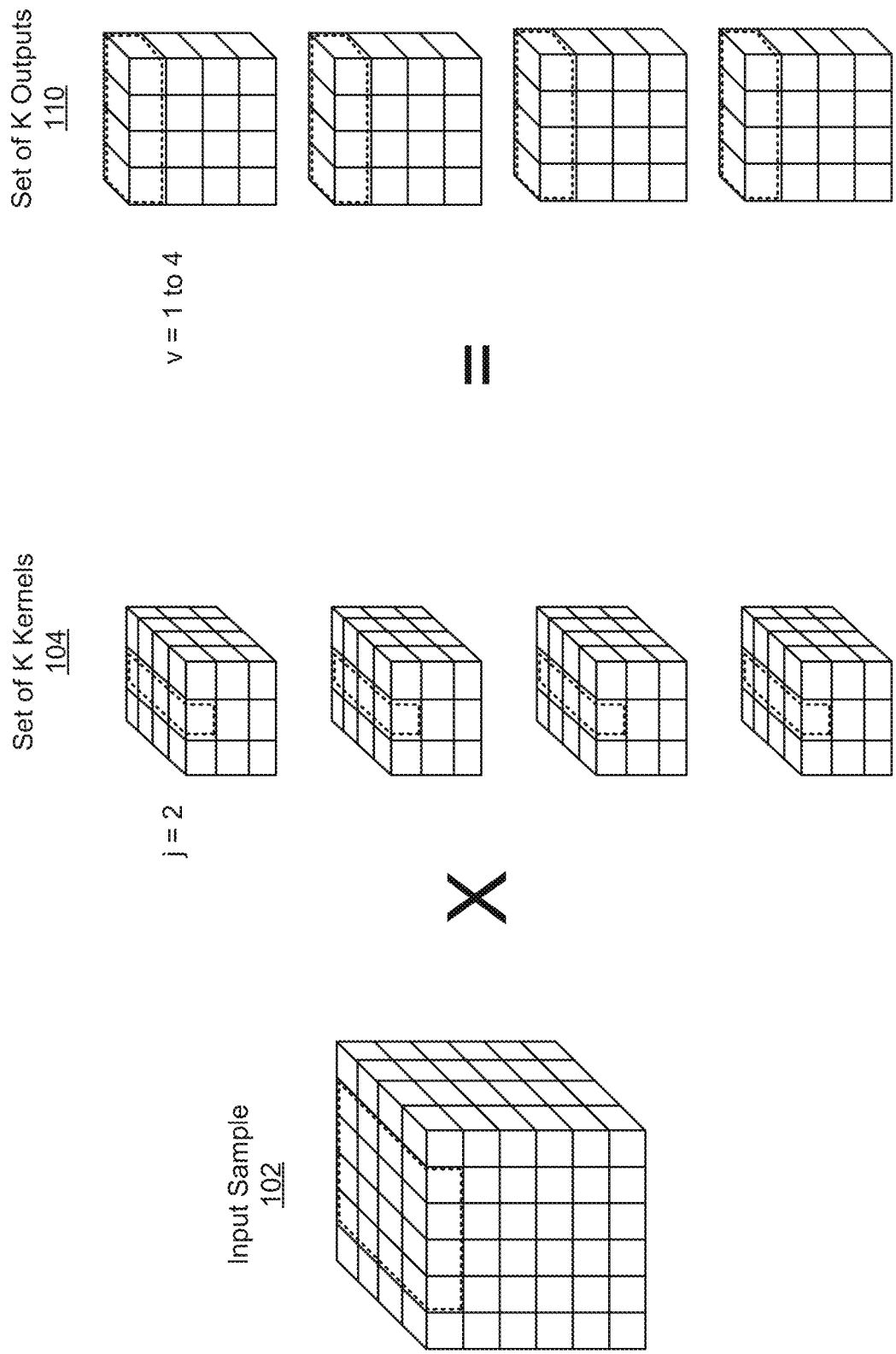

FIGS. 4-5 illustrate the implementation of convolution using the mappings shown in FIGS. 2-3. FIGS. 4A-4C illustrate a first matrix multiplication (referred to as MM #1) and FIGS. 5A-5C illustrate a second matrix multiplication (MM #2). In each figure, subfigure A shows the input pixels, subfigure B shows the kernel pixels and subfigure C shows the overall step producing a partial product for the output pixels. In this example, the dimensions m and n of the input data buffer 302 and the dimensions n and o of the kernel buffer 304 are each equal to 4. The input sample 102 has H=6 pixel values in height, W=6 pixel values in width, and C=4 channels in depth as shown in FIG. 2B. The set of K kernels 104 has R=3 pixel values in height, S=3 pixel values in width, and C=4 channels in depth as shown in FIG. 2C. The stride $S_W$=1 and stride $S_H$=1. With these values, each of the K outputs 110 has size P=4 pixels by Q=4 pixels.

To perform the K convolutions used to generate the set of K outputs 110, different kernel pixels j are mapped across matrix multiplications of different X and Y matrices. MM #1 of FIG. 4 uses the kernel pixels for j=1 across each of channels c=1 to 4 and kernels k=1 to 4 and corresponding data pixels of the convolution. MM #2 of FIG. 5 uses the kernel pixels for j=2 across each of channels c=1 to 4 and kernels k=1 to 4 and corresponding data pixels of the convolution, and so forth for all of the kernel pixels j=1 to J and corresponding data pixels of the convolution.

In FIG. 4A, the kernel pixels for kernel pixel index j=1 for each of channels c=1 to 4 and kernels k=1 to 4 are loaded to the Y matrix of the kernel buffer 304. The kernel pixels for j=1 for each of the four channels are mapped to the n=4 rows of the kernel buffer 304 and the four kernels are mapped to the o=4 columns of the kernel buffer 304.

In FIG. 4B, the data pixels in the first row of the block of the input sample 102 to be multiplied with the kernel pixels for j=1 are loaded to the X matrix. The data pixels for i=1 to 4 are mapped to the m=4 rows of the input data buffer 302 and the four channels are mapped to the n=4 columns of the input data buffer 302. Note that there is no duplication in memory 274, yet we are able to read out the correct rows from memory into the X matrix input buffer and efficiently perform matrix multiplication. In a conventional approach in which the matrix multiplication calculates the contributions from many kernel pixels j, the matrix being multiplied typically has significant duplication of values in memory. That duplication is avoided here because the matrix multiplication is for a single kernel pixel j. In this example, consecutive values of the data pixels i=1 to 4 in the first row of the block of the input sample 102 are selected based on the stride $S_W$=1. If stride $S_W$=2, then every other value in the first row of the block is selected, if stride $S_W$=3, then every third value in the row, etc.

In FIG. 4C, The X matrix of FIG. 4B is matrix multiplied with the Y matrix of FIG. 4A to generate a Z matrix that is stored in the output buffer 306. The Z matrix contains the partial products produced by the j=1 kernel pixel for output pixels v=1 to 4 and kernels k=1 to 4. These are partial products because the full output value also sums contributions from the other kernel pixels j=2 to 9.

FIG. 5 illustrates the matrix multiplication to calculate the partial product from the kernel pixel j=2. In FIG. 5A, the kernel pixels for j=2 for each of channels c=1 to 4 and kernels k=1 to 4 are loaded to the Y matrix of the kernel buffer 304. The kernel pixels for j=2 for each of the four channels are mapped to the n=4 rows of the kernel buffer 304 and the four kernels are mapped to the o=4 columns of the kernel buffer 304.

In FIG. 5B, the data pixels in the first row of the block of the input sample 102 to be multiplied with the kernel pixels for j=2 are loaded to the X matrix. The data pixels for i=2 to 5 are mapped to the m=4 rows of the input data buffer 302 and the four channels are mapped to the n=4 columns of the input data buffer 302. Consecutive values of the data pixels i=2 to 5 in the first row of the block of the input sample 102 are selected based on the stride $S_W$=1.

Now compare the X matrices of FIGS. 4B and 5B. For MM #1 (FIG. 4B), the X matrix is rows 1-4 of the input samples 102 stored in memory. In MM #2 (FIG. 4B), the X matrix is rows 2-5 of the input samples 102 stored in memory. Thus, "loading" the X matrix for MM #2 only requires the loading of row 5, because rows 2-4 were previously loaded for MM #1. This can significantly reduce data transfers. In one approach, circuitry may calculate which rows are "loaded" for MM #3, MM #4, etc.

In FIG. 5C, the X matrix of FIG. 5B is matrix multiplied with the Y matrix of FIG. 5A to generate a Z matrix. The Z matrix contains the partial products produced by the j=2 kernel pixel for output pixels v=1 to 4 and kernels k=1 to 4. If the partial product Z from MM #1 was previously stored, then the partial product Z from MM #2 may be added to this to form a running sum, without any modification to the previously stored partial product, building up to the full product.

The computations shown in FIGS. 4 and 5 are repeated for kernel pixels j=3 to 9. After nine matrix multiplications, the output pixels for v=1 to 4 will have been computed. Note that this approach may be extended to kernels of any size simply by increasing the number of loops, while still maintaining the inherent efficiencies of this approach. Returning to this example, the loop of nine matrix multiplications may then be repeated for other output pixels (values of v=5 to 16). In this example, the full convolution is completed after 36 matrix multiplications.

In the example of FIGS. 4 and 5, for clarity, the values of C, H, W, R, S, P, Q, K were selected to match the matrix dimensions m=n=o=4. Specifically, C=n, K=o, and P=m. With these values, all channels, all kernels and an entire row of output pixels may be accounted for in one matrix multiplication. However, this may not be the case for real machine learning networks. For cases where P>m, C>n, and/or K>o, those dimensions may be decomposed into matrix multiplications of dimensions m, n, o. For most matrix multipliers, m=n=o=power of 2.

Using a dimensional analysis, the size of the convolution problem is determined by five quantities: C (number of channels), I (number of data pixels), J (size of kernel), K (number of kernels) and V (number of output pixels). However, I, J and V are not independent. Given the stride of the convolution, any two of these may be used to calculate the third, so there is a total of four degrees of freedom, say C (number of channels), J (number of pixels in kernel), K (number of kernels) and V (number of output pixels). The row and column dimensions of the X and Y matrices map to C, K and V. Note that there is no mapping to J. Each matrix multiplication is for a specific kernel pixel index j. The dimension J is handled by looping through the matrix multiplication for different values of j. If C, K and V are larger than can be handled in a single matrix multiplication, then those will also be handled by loops. One advantage of this approach is that the computation efficiency is independent of the size J of the kernel, which is beneficial for a variety of machine learning networks.

Figure 6A:
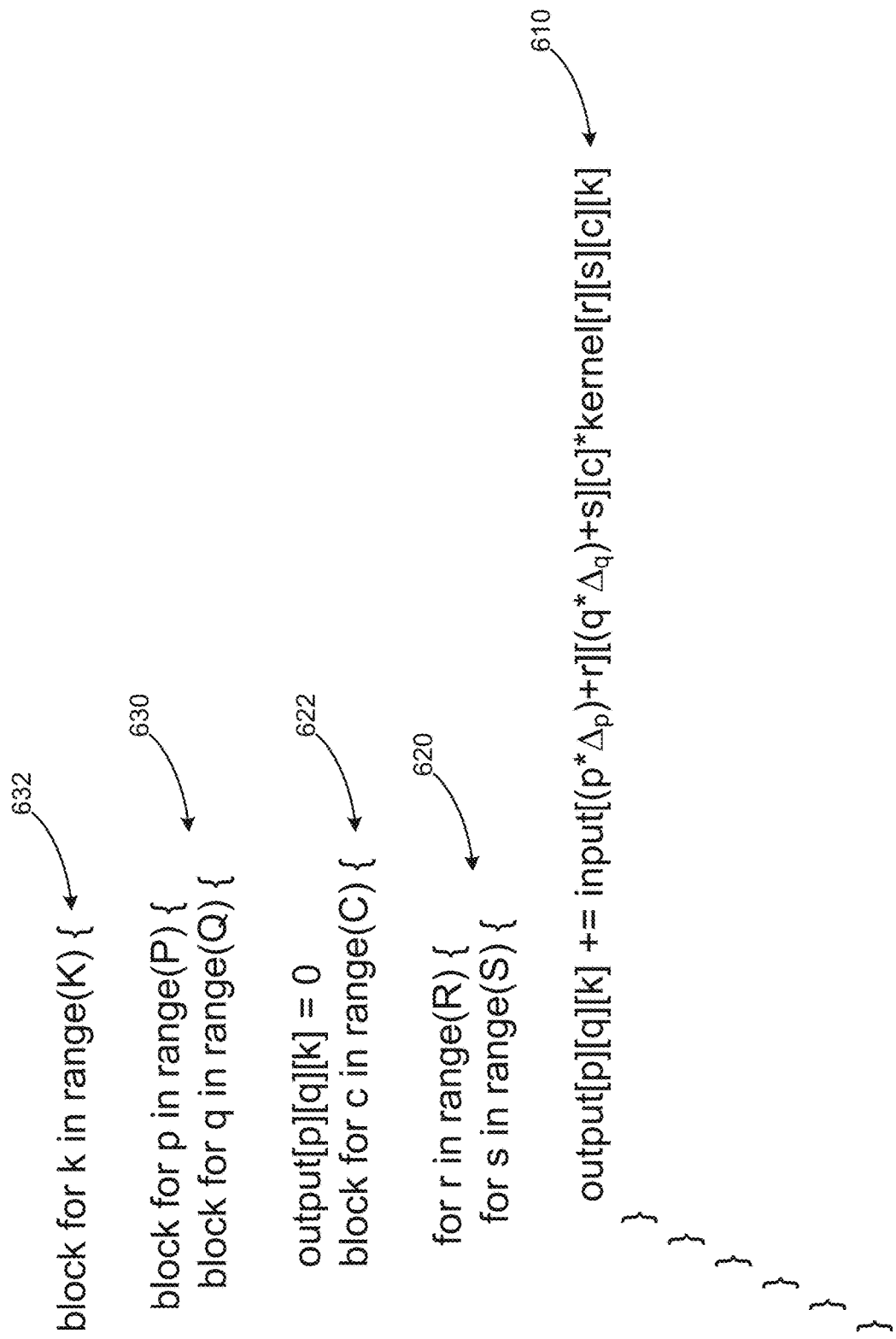
FIG. 6A is pseudocode of a method for computing a set of K outputs produced by an input sample convolved with each of K kernels.

FIG. 6A is pseudocode for computing a set of K outputs produced by an input sample convolved with each of K kernels. The method may have fewer or additional steps, and steps may be performed in different orders or in parallel. In this pseudocode, output[p,q,k] is the output pixels, input[h][w][c] is the input pixels, and kernel[r][s][c][k] is the kernel pixels. The variables are the same as used throughout this disclosure; "$\Delta_r$" and "$\Delta_q$" are the stride of the convolution. The variables may be individual values or a block of values. For example, output[p][q][k] in statement 610 is the running sum of the Z matrix which covers a block of outputs [p][q] and a block of kernels [k]. The "for" statements are loops, and the "block for" statements are loops where each iteration of the loop covers a different block of the loop variable.

Statement 610 is the matrix multiply and accumulate described in FIGS. 4 and 5. "input" is the X matrix, where r, s and $\Delta$ are scalars, and [p][q] and [c] are the two dimensions of the matrix. "kernel" is the Y matrix, where r, s are scalars, and [c] and [k] are the two dimensions of the matrix. The multiplication input*kernel is the Z matrix. The operation +=accumulates the Z matrix over different values of [r][s][c], which are the inner loops 620, 622. The order of the [r][s][c] loops are chosen to reduce data transfer, i.e., to increase the overlap between X matrices from loop to loop and to match the format of input values in the X matrices to the format in which those values are stored in memory. In this example, the [r][s] loops 620 are the innermost, which cycles through the different kernel pixels j. Of those two, the [s] loop is the innermost, which matches the examples of FIGS. 4 and 5 and produces the sliding window effect over the pixel data. If there are more channels than can be handled in a single matrix multiplication, those are handled by block loop 622. The outer loops 630, 632 cycle over blocks of [p][q][k]. The [p][q] block loops 630 produce different arrays of output pixels. The [k] block loop 632 handles additional kernels. The loops may also be parallelized to run on multiple matrix multipliers.

The order of the loops may be different in different implementations. For example, the channel block loop 622 may be moved to any position. It may be the innermost loop, the outermost loop or any position in between. In other embodiments where multiple kernels reuse the same input data pixels, the [k] block loop 632 can be the innermost loop to enable better reuse of input data pixels. In other embodiments to enable better reuse of kernel pixels the [p][q] block loops 630 may be the innermost loops where multiple output data pixels are generated by reusing same kernel pixels over multiple input data pixels.

Figure 6B:
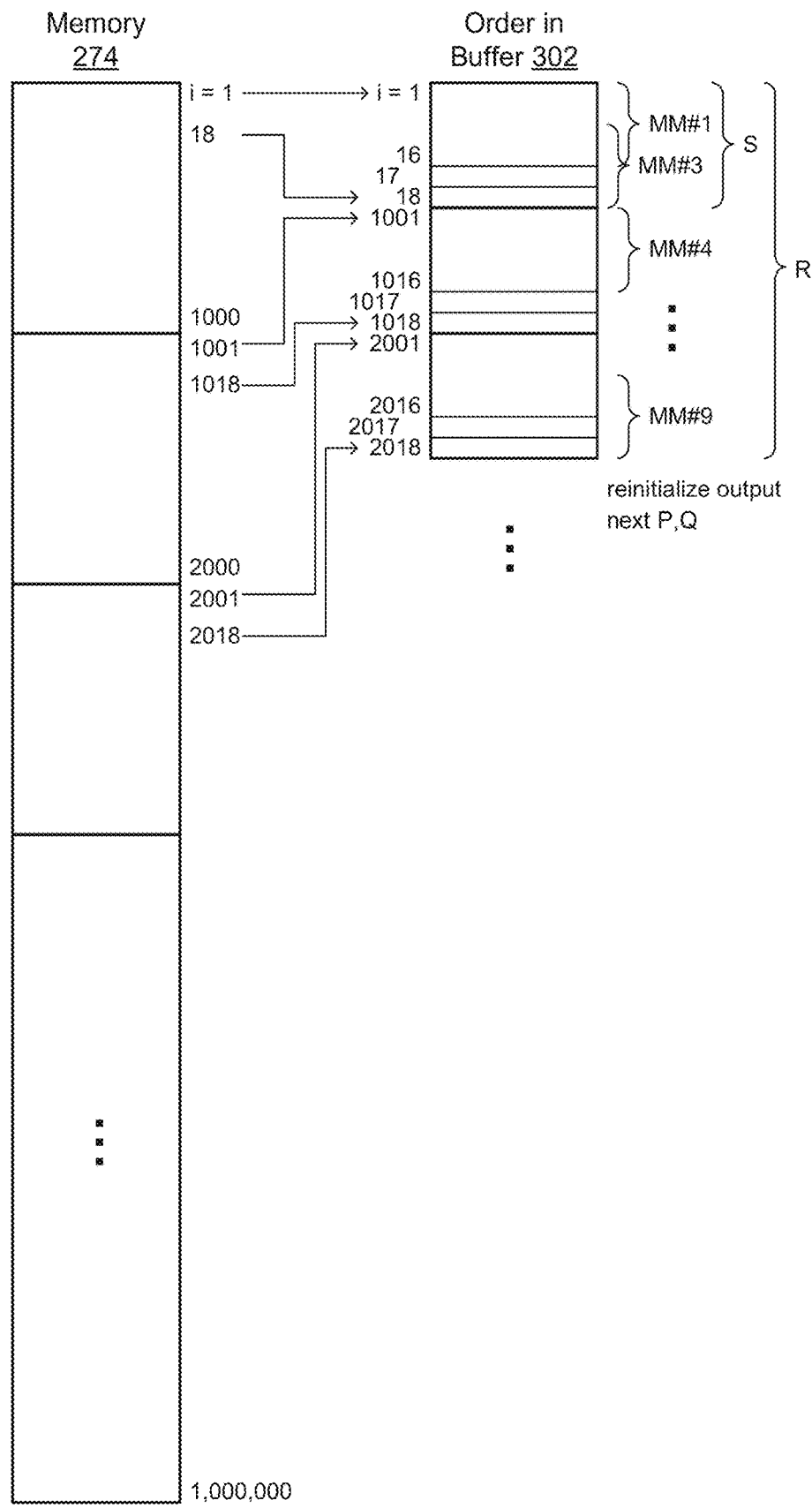
FIG. 6B illustrates streaming of data pixels from memory for the pseudocode of FIG. 6A.

FIG. 6B illustrates a mapping of input pixels stored in memory to their order of consumption by the matrix multiplier, using the loops shown in FIG. 6A. This is an extension of the mappings shown in FIGS. 4B and 5B. In this example, for clarity, the kernel loop and channel loop are ignored. The input sample is 1000×1000, so H=W=1000 and I=1,000,000. The kernels are the same size as before: 3×3. The matrix multiplier is square but can handle 16×16 matrices, so m=n=o=16. The memory 274 stores the 1,000,000 input pixels, i=1 to 1,000,000, one pixel per row. For clarity, the channels are not shown but they are stored in separate columns, as described previously. The buffer 302 consumes the input pixels in the order shown. The first matrix multiplication MM #1 uses pixels 1-16, MM #2 uses pixels 2-17 and MM #3 uses pixels 3-18. This completes the innermost S loop of FIG. 6A. MM #4-6 uses pixels 1001-1018 and MM #7-9 uses pixels 2001-2018 and proceed in a similar fashion, completing the R loop of FIG. 6A. Each MM calculates a partial product for output pixels 1-16. These are accumulated so that at the end of the R loop, the full value of output pixels 1-16 have been computed. This is then repeated for the next block of output pixels (the P,Q loops).

FIGS. 7-10 describe a system that may be used to implement the convolutions described previously. FIG. 7A is a block diagram of one example of a system with a machine learning accelerator (MLA) 770 and corresponding compiler 720, according to the invention. The compiler 720 receives a description of a machine learning network 700 and generates a computer program 750 that implements the machine learning network using MLA 770. The computer program 750 includes instructions that are executed by processing elements (Tiles) in the MLA according to a schedule determined by the compiler. For convenience, these will be referred to as statically scheduled instructions. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 700 may be described by an architecture and parameters. A depiction of an MLN is shown to the right of box 700 in FIG. 7A. Most MLNs include multiple layers 702, each with one or more nodes which are represented by circles in FIG. 7A. The lines between nodes in FIG. 7A represent interconnections between the nodes (and layers). Each node calculates a weighted sum of the values received from its connected nodes, possibly also applying a bias. Examples are matrix multiplication and convolution, such as described above. Each node may also apply certain functionality (operators), such as nonlinear functions (e.g., tanh function), softmax operator, etc. A typical node may compute an output:

$$y=F(\Sigma w_i x_i + b) \qquad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video, with multiple channels. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 770 includes a plurality of Tiles 780 and an on-chip memory system implemented on a semiconductor die. The Tiles are organized into one or more meshes of interconnected Tiles. A depiction of a Tile mesh is shown to the right of box 770 in FIG. 7A. In each mesh, the Tiles 780 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 7A, the computations performed by layers 702A-D are allocated to groups 782A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 720 receives a description of the MLN 700 and generates a computer program 750 that implements the MLN using the MLA 770. The computer program 750 receives an input sample for the MLN and executes the operations of the MLN to produce the output for the MLN. The computer program 750 includes instructions to be executed by the Tiles for implementing computations in the MLN and may also include instructions to be executed by other elements, such as a controller outside the Tiles.

As shown in FIG. 7B, the compiler partitions the Tile instructions into one or more deterministic phases 752A,B,C which typically utilize multiple Tiles. The instructions in a deterministic phase 752 may be statically scheduled by the compiler. For example, a deterministic phase 752 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained within the computer program. In the example of FIG. 7A, the computations performed by layers 702A-D are allocated to groups 782A-D of Tiles as indicated. In addition, all of the Tile instructions (including both for computation and for data transfer) are executed in a single deterministic phase.

The computer program may also include non-deterministic phases 754X,Y. For example, non-deterministic phases 754 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 754 indicate that the timing is not deterministic, whereas the deterministic phases 752 are represented by rectangles without breaks. In FIG. 7B, the deterministic and non-deterministic phases are shown as alternating. This is not required. For example, deterministic and non-deterministic phases may execute concurrently.

FIG. 7B also shows more detail of deterministic phase 752B, which shows the static schedule computed by the compiler for executing Tile instructions in this phase. The phase 752B begins at some time when all of the Tiles are synchronized, which for convenience is marked as cycle c0 in FIG. 7B. The Tiles may have circuitry that synchronizes the Tiles. For example, each Tile may monitor when it is ready to begin execution of a deterministic phase 752B and then actual execution begins when all Tiles signal that they are ready. Alternatively, an external controller may synchronize the Tiles and start the deterministic phase 752B when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 755a transfers data into Tile 1 and instruction 755b then performs a computation that consumes that data. Instruction 755b is dependent on instruction 755a. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 755a is known, the compiler knows when the data will be available (for convenience, marked as cycle c1 in the figure) and can construct a static schedule in which instruction 755b starts execution then. The duration of instruction 755b is also known, so the compiler knows that compute instruction 755d may start after instruction 755b. In this case, the compiler determines a static schedule in which instruction 755d starts at cycle c3. Compute instruction 755d depends on data brought into the Tile by instruction 755c. The duration of instruction 755c is known, so the compiler knows that in the static schedule, instruction 755c must start at cycle c2 or earlier. This pattern is repeated for pairs of data transfer instructions and compute instructions 755e-f, 755g-h, 755i-j.

For Tile 2, compute instruction 755l depends on data from data transfer instruction 755k. However, instruction 755k does not start immediately at cycle c0. Rather, it has a delayed start at cycle c4. This may be because the data transfer path required by instruction 755k is occupied by some other data transfer instruction and is not available until cycle c4. The start time of instruction 755k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 755k does not start until cycle c4 when the compiler knows the data transfer path will be available. Similarly, data transfer instruction 755m has a delayed start time. Perhaps the T2 D pipeline is being used to transfer out the results of computation 755l and does not become available until cycle c5.

For Tile 3, computation 755n starts immediately at cycle c0. Perhaps the required data was loaded into Tile 3 during some prior phase. Data transfer instructions 755o and 755p load data for compute instruction 755q. They are separated in time, perhaps because different pieces of data were not available or the data transfer paths were not available until those times. As a final example, data transfer instruction 755r loads data for compute instruction 755s. In the static schedule, the compiler places instruction 755r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 7B, the computer program may specify that instruction 755a executes at cycle c0, instruction 755b at cycle c1, instruction 755c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 755a will end at cycle c1 and instruction 755b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 755b is executed according to the compiler's static schedule. In yet another approach, the static schedule may be implemented by hardware. The T1 C pipeline may just stall on the execution of instruction 755b until the data from instruction 755a is ready. The compiler knows that data will be ready at cycle c1 and, therefore, instruction 755b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

Other aspects include components, devices, systems, improvements, methods, processes, applications, computer readable mediums, and other technologies related to any of the above.

Figure 8A:
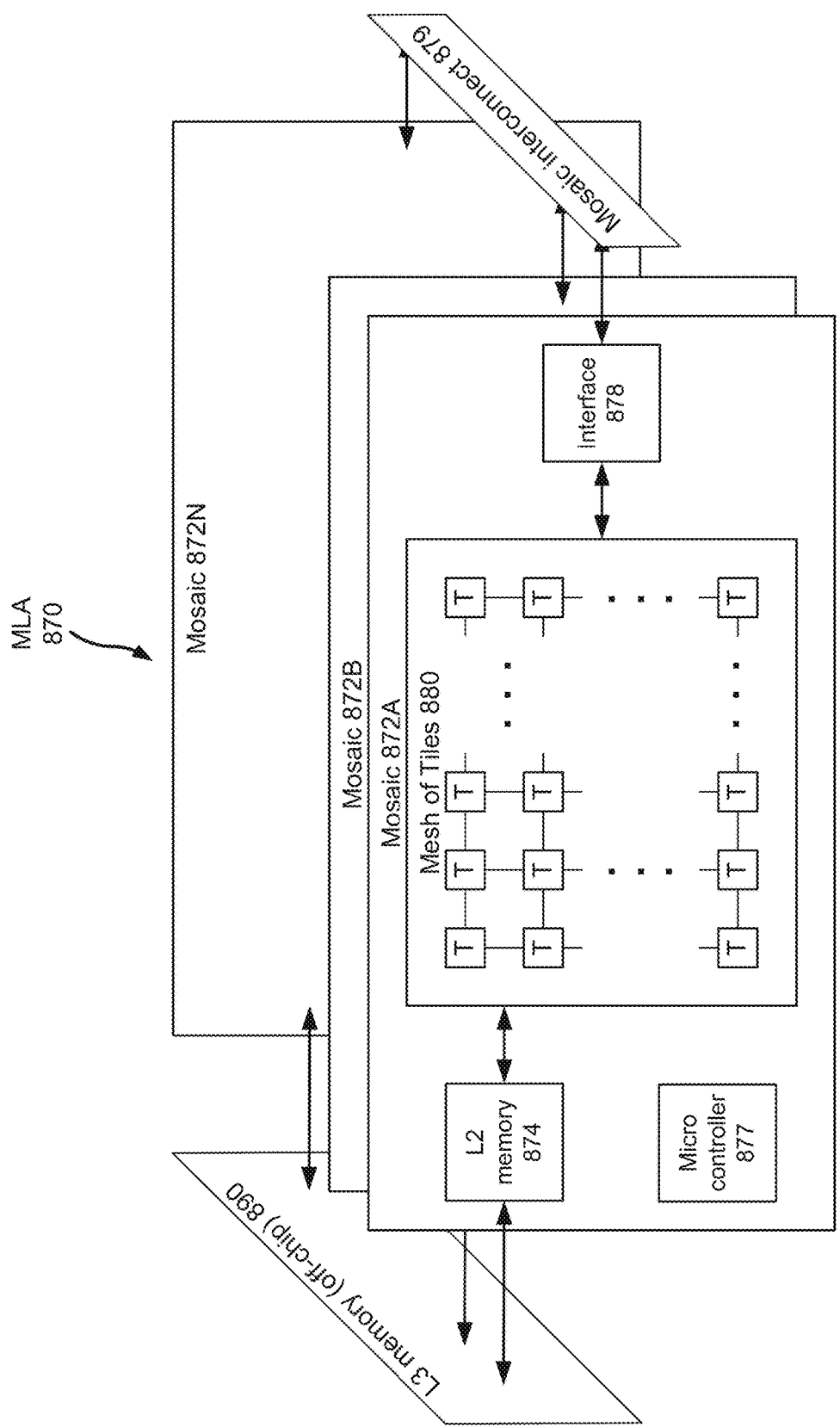
FIG. 8A is a block diagram of a hardware system, including an MLA.
Figure 8B:
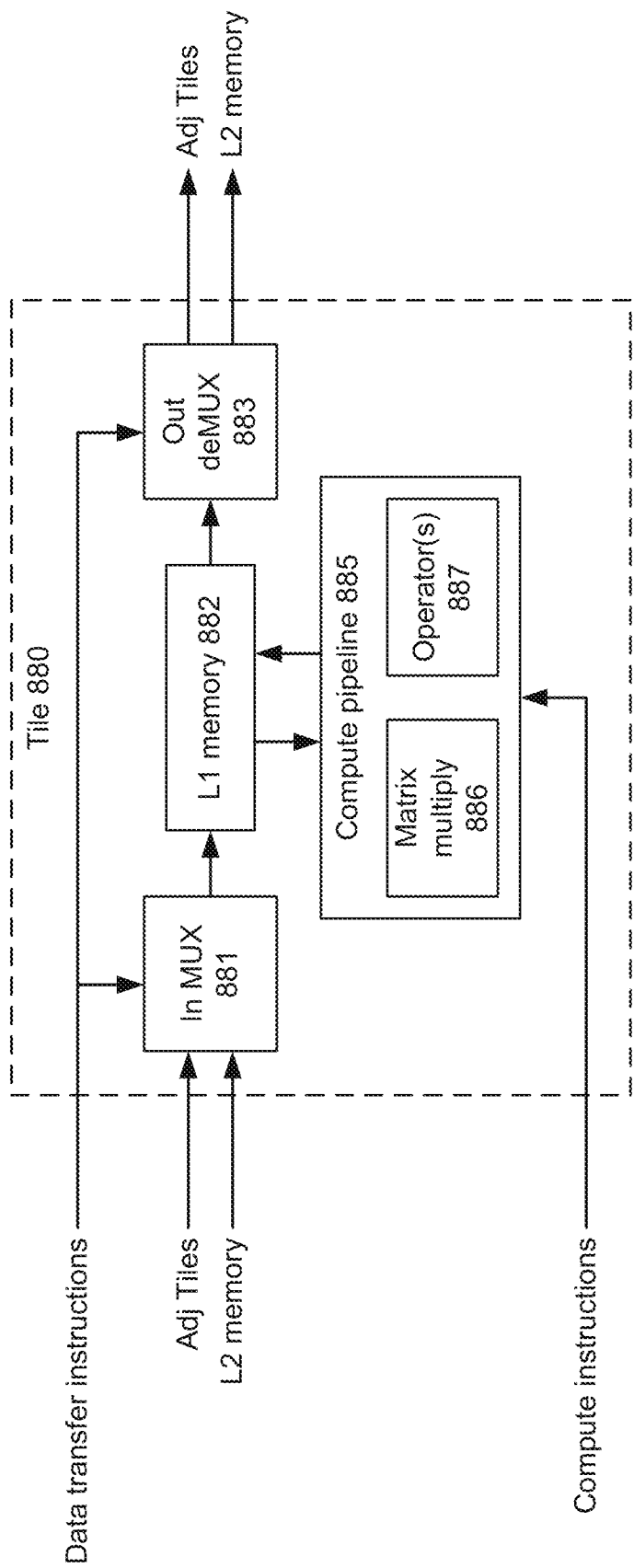
FIG. 8B is a block diagram of a Tile within an MLA.
Figure 9:
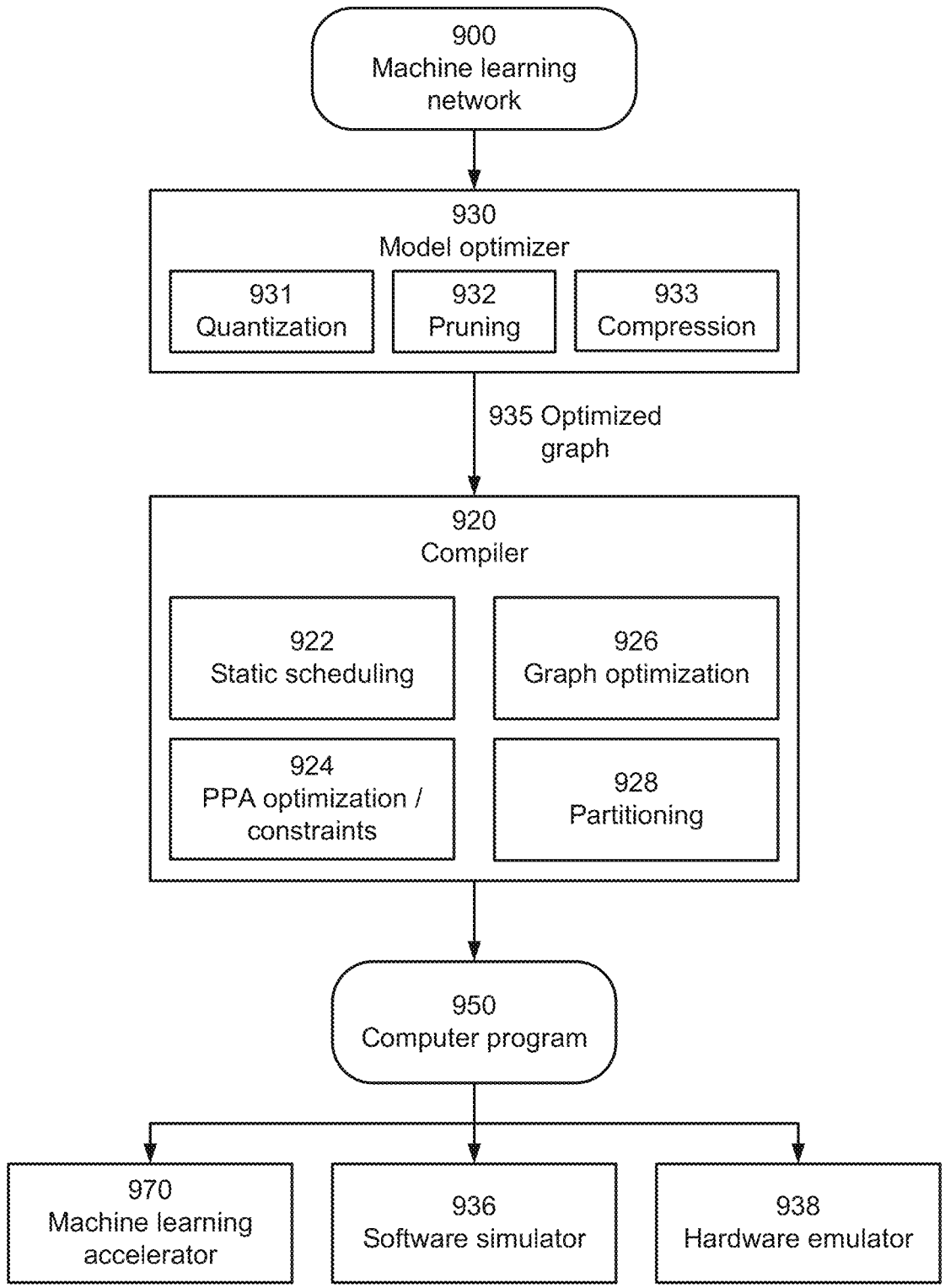
FIG. 9 is a block diagram of a software development environment, including an ML compiler.

FIGS. 8-9 are more detailed descriptions of an example system that includes an MLA and corresponding compiler. FIG. 8 shows the hardware component and FIG. 9 shows the software development environment.

FIG. 8A is a block diagram of a hardware system including an MLA 870. The MLA 870 includes all the components shown in FIG. 8A, except the off-chip L3 memory 890. The MLA components are implemented on a single die as part of a single chip. The MLA 870 includes one or more mosaics 872A-N. In this example, all of the mosaics are the same. Each mosaic 872 includes a mesh of Tiles 880, an on-chip memory system and a controller 877. In FIG. 8A, the on-chip memory system is a multi-level memory system, which includes a level 1 (L1) memory distributed among the Tiles (see FIG. 8B) and a level 2 (L2) memory 874 shared by the Tiles. If there are multiple mosaics 872, the MLA 870 may include a dedicated interconnect 879 for connecting the different mosaics. Each mosaic also includes an interface 878 to the interconnect 879.

FIG. 8B is a block diagram of a Tile 880 within the MLA. In this example, all the Tiles are the same. Each Tile 880 includes an L1 memory 882. Each Tile 880 also includes a data transfer pipeline that executes instructions for transferring data to and from the L1 memory 882. Here, the Tiles 880 are arranged in a rectangular array as shown in FIG. 8A, with each Tile connected to its adjacent neighbors. Interior Tiles are connected to four adjacent Tiles. Edge Tiles are connected to adjacent Tiles and also to L2 memory 874. In FIG. 8B, the L1 memory 882 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 880 also includes a compute pipeline 885 for executing computations using data stored in the L1 memory 882. The L1 memory acts as software-configurable registers for the compute pipeline 885. The compute pipeline 885 includes matrix multiplication circuitry 886, such as a systolic array, and circuitry for implementing different types of operators 887. The computations are controlled by compute instructions received and executed by the Tiles.

Comparing to FIGS. 3 and 6B, the full set of input pixels (1,000,000 input pixels in FIG. 6B) is stored in the L3 memory. The Tiles 880 correspond to the processing elements 380 of FIG. 3 and the compute pipeline 885 includes the hardware matrix multiplier 385. The compute pipeline 885 pulls the X and Y matrices from the L1 memory 882 and writes the resulting Z matrix back to L1 memory 882. If the L1 memory 882 is not large enough, L2 memory can provide additional memory space. In the example of FIG. 6B, there are 1,000,000 input pixels but only 9 pixels/kernel×16 kernels=144 kernel pixels. Thus, the kernel pixels may be stored locally in L1/L2, while the data pixels are streamed in from L3 as described in FIG. 6B.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 890 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 877. Therefore, they are executed in one of the non-deterministic phases and they are not statically scheduled.

In one approach, the instructions in the computer program and the data required for computation (e.g., input, weights, biases, parameters for operators) are initially loaded into L3 memory 880. From time to time, instructions and associated data are transferred from L3 memory into L1/L2 memory during a non-deterministic phase since the timing of data transfers from DRAM is not deterministic. Once these instructions and data are loaded into L1/L2 memory, the computer program enters a corresponding deterministic phase in which the Tiles execute the loaded instructions according to a static schedule. The non-deterministic and deterministic phases may occur concurrently. For example, data may be continuously streamed into the L1/L2 memory during the non-deterministic phase, with the corresponding statically scheduled instructions from the deterministic phase consuming that data. In one approach, the Tiles execute only statically scheduled instructions, and all non-statically scheduled instructions are executed by processing elements outside the Tile mesh, for example, the microcontroller 877.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations. This may be implemented using a ping pong buffer approach when multiple input samples are processed as a pipeline. The L2 memory is divided into two regions A and B. When a first input sample is processed, the layer K output is stored in region A of the L2 memory. The computations for layer K+1 retrieve the stored values from region A. At the same time, the second input sample is processed and the layer K output is stored in region B of the L2 memory. The two regions then alternate, with the Tiles implementing layer K storing to one region while the Tiles implementing layer K+1 read from the other region. The synchronization is implemented by the static scheduling. The compiler knows when regions AB will be ready and the instructions to implement layer K+1 will execute after that time. No synchronization primitives are needed.

FIG. 9 is a block diagram of a software development environment including an ML compiler 920. In this example, the software development environment also includes a model optimizer 930. The model optimizer 930 receives a description of the MLN 900 and produces an optimized graph 935 of the MLN. It may apply optimizations such as quantization 931, pruning 932 and/or compression 933. Quantization 931 reduces the resolution of calculated values. For example, floating point values may be quantized to a certain number of bits and then integer math used instead of floating point math. This reduces the complexity and power consumed by the Tiles. Pruning 932 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 935 of the MLN may be expressed as a graph, in which the nodes of the graph represent nodes in the MLN and the edges of the graph represent the weighted interconnects. The compiler 920 receives the optimized graph 935 and produces the resulting computer program 950. The compiler 920 may perform operations including static scheduling 922, PPA (power performance area) optimizations 924, graph optimizations 926 and/or partitioning 928. Static scheduling 922 of the appropriate instructions was described above.

PPA optimization 924 includes different optimizations of the computer program 950. For example, the allocation of MLN computations to Tiles may be optimized to reduce power consumption, to increase performance (such as reducing latency or increasing throughput) and/or to reduce area (e.g., number of Tiles used).

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 920 may also optimize 924 the computer program 950, subject to constraints on power, performance, area and/or any of the quantities described above. Graph optimization 926 includes analysis of the graph representing the MLN to prune, merge or quantize links, parameters, values, and layers to achieve better performance. Partitioning 928 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 950 may be loaded into memory for execution on a machine learning accelerator 970. For example, one possible application is object detection. In this case, the inputs are images captured by a video camera. The MLN 900 has been trained to identify certain objects in the video images. The computer program 950 implementing the MLN is loaded onto memory that is accessible by the MLA 970, which is implemented as a chip inside the camera. This way, images captured by the video camera may be immediately analyzed by the computer program 950 running on the MLA 970.

In addition to the MLA 970, the computer program 950 or parts of it may be run on a software simulator 936 and/or hardware emulator 938 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

The approach based on static scheduling described in FIGS. 7-9 is not restricted to the examples described above. For example, different network topologies of Tiles may be used. Other Tile meshes may also be statically scheduled, so long as the time required to execute computations and to transfer data between Tiles is deterministic and may be determined at compile time. For additional examples, see U.S. application Ser. No. 16/840,216, "Machine Learning Network Implemented by Statically Scheduled Instructions, with Compiler," which is incorporated by reference herein in its entirety.

Figure 10:
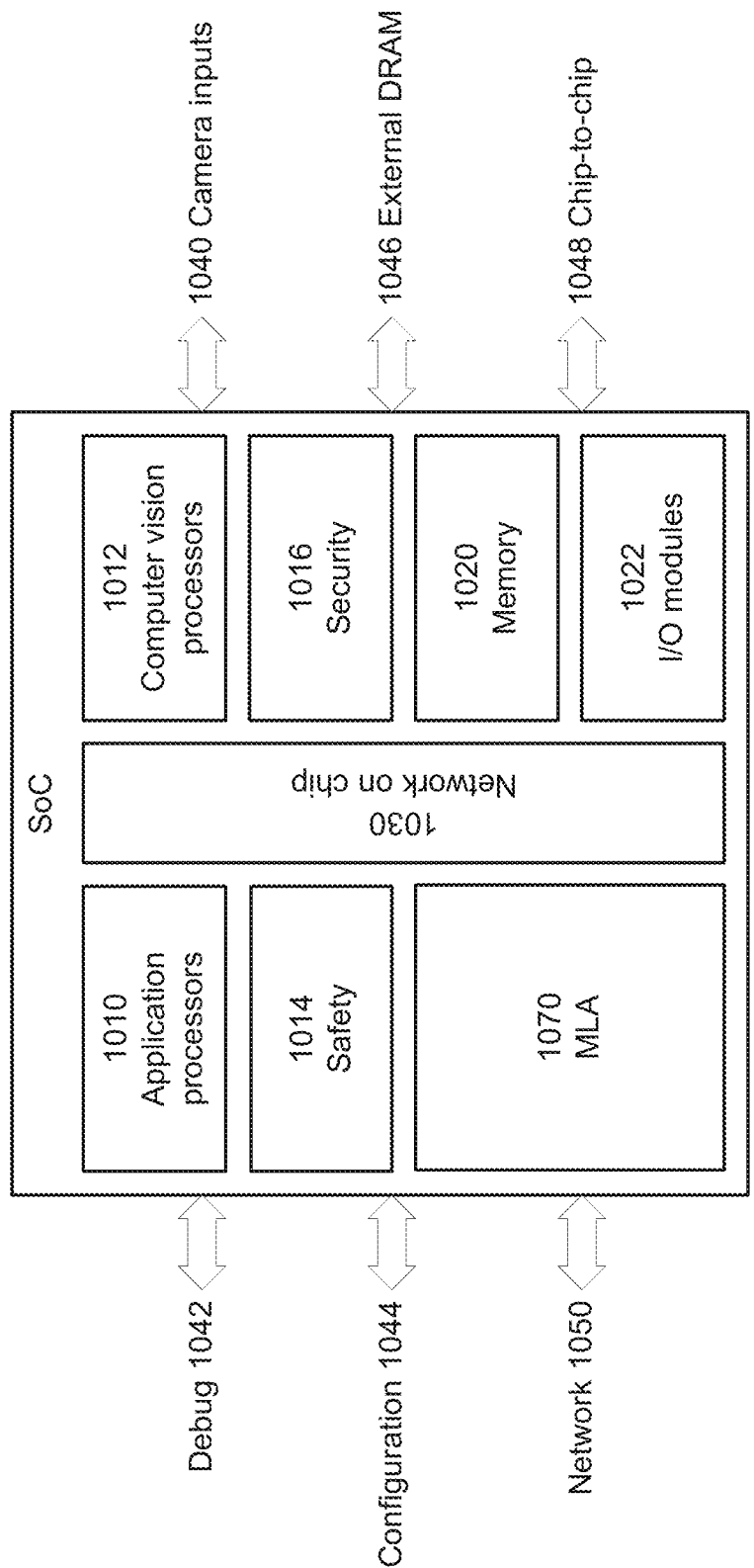
FIG. 10 is a block diagram of an integrated circuit product that includes an MLA.

FIG. 10 is a block diagram of an integrated circuit that includes an MLA 1070. In other words, other components may be included on the same die as the MLA. This example includes the following additional blocks: application processor 1010 (e.g., general purpose CPU running applications), computer vision processor 1012 (or other types of application-specific processors), safety 1014, security 1016, additional SRAM (memory) 1020 and input/output circuitry 1022. It also includes a network 1030 for communication between the different components. This type of semiconductor chip may be referred to as a system-on-chip (SoC).

The connections to the external world include camera inputs 1040 for the computer vision processors, ports for debug 1042 and configuration 1044, a connection 1046 to external memory (e.g., DRAM), chip-to-chip connections 1048, and network connections 1050 (e.g., Ethernet and PCIe).

The SoC of FIG. 10 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 1012, which perform initial operations such as edge detection and enhancement, contrast enhancement, motion detection, and optical flow. Raw and/or processed images may be then input to the MLA 1070 for analysis by the machine learning network. The MLA may also receive other inputs, such as metadata from other sources and data from other sensors. The application processors 1010 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. For example, the matrix multiplications discussed herein may be performed using other types of processing circuitry. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for computing a set of K outputs produced by an input sample convolved with each of K kernels, the input sample and the K kernels each comprising C channels, the method comprising:
    decomposing the convolutions into a plurality of matrix multiplications of input matrices X times kernel matrices Y to produce partial product matrices Z;
    for each matrix multiplication of X×Y=Z:
        transferring data pixels of the input sample to an individual one of a set of hardware matrix multipliers as the input matrix X, wherein rows of X correspond to different data pixels from the input sample and columns of X correspond to different channels;
        transferring kernel pixels from multiple kernels to the individual hardware matrix multiplier as the kernel matrix Y, wherein rows of Y correspond to different channels and columns of Y correspond to different kernels, but all elements of Y are for a same kernel pixel index; and
        the individual hardware matrix multiplier performing the matrix multiplication of X×Y=Z, wherein rows of Z correspond to different output pixels and columns of Z correspond to different kernels, but all elements of Z are for the same kernel pixel index;
    wherein a mesh of interconnected Tiles on a semiconductor die include the set of hardware matrix multipliers, and the hardware matrix multipliers performing the matrix multiplications comprise the Tiles executing statically scheduled instructions for the hardware matrix multipliers to perform the matrix multiplications; and
    combining the partial product matrices Z to produce the set of K outputs.

2. The method of claim 1 wherein the input sample is stored in a memory using a format where different rows of memory store different data pixels and different columns of memory store different channels; and transferring data pixels to the matrix multiplier preserves the format.

3. The method of claim 2 wherein the input sample is stored in the memory without duplication of data pixels.

4. The method of claim 1 wherein the kernels are stored in a memory using a format where different rows of memory store different kernel pixels and different columns of memory store different channels; and transferring data pixels to the matrix multiplier preserves the format.

5. The method of claim 1 wherein performing the matrix multiplications of X×Y=Z comprises performing the matrix multiplications of X×Y=Z in a loop, wherein each iteration of the loop performs X×Y=Z for a different kernel pixel index.

6. The method of claim 5 wherein each kernel has size R×S, and the loop comprises an outer loop with respect to the R dimension and an inner loop with respect to the S dimension.

7. The method of claim 5 wherein transferring data pixels to the matrix multiplier occurs in an order determined by the loop.

8. The method of claim 5 wherein iterations of the loop accumulate the partial product Z.

9. The method of claim 8 wherein performing the matrix multiplications of X×Y=Z further comprises a second loop with respect to different blocks of channels, and iterations of the second loop also accumulate the partial product Z.

10. The method of claim 8 wherein performing the matrix multiplications of X×Y=Z further comprises an outer loop with respect to different blocks of output pixels.

11. The method of claim 1 wherein X, Y and Z are all square matrices.

12. A system for computing a set of K outputs produced by an input sample convolved with each of K kernels, the input sample and the K kernels each comprising C channels, the system comprising:
    an accelerator comprising a set of one or more hardware matrix multipliers that perform X×Y=Z;
    a compiler that receives a description of the convolutions and generates a computer program of instructions that implements the convolutions on the matrix multipliers, wherein generating the computer program comprises:
        decomposing the convolutions into a plurality of matrix multiplications of input matrices X times kernel matrices Y to produce partial product matrices Z, wherein rows of Z correspond to different output pixels and columns of Z correspond to different kernels, but all elements of Z are for the same kernel pixel index;
        allocating the matrix multiplications to the one or more matrix multipliers;
        generating instructions for the one or more hardware matrix multipliers to perform the matrix multiplications of X×Y=Z; and
        generating instructions to combine the partial product matrices Z to produce the set of K outputs; and
    a machine learning accelerator (MLA) comprising a mesh of interconnected Tiles on a semiconductor die, the Tiles comprising the set of hardware matrix multipliers;
    wherein the computer program comprises Tile instructions for execution by the Tiles; the Tile instructions include the instructions for the hardware matrix multipliers to perform the matrix multiplications; and the compiler statically schedules said Tile instructions.

13. The system of claim 12 wherein the accelerator further comprises one or more hardware accumulators configured to accumulate the partial product matrices Z.

14. The system of claim 12 wherein the hardware matrix multipliers comprise systolic arrays.

15. The system of claim 12 wherein:
    the MLA further comprises an on-chip memory system also on the semiconductor die and accessible by the Tiles;
    generating the computer program of instructions further comprises, for each matrix multiplication of X×Y=Z:
        generating instructions to transfer data pixels of the input sample from an external memory to the on-chip memory system, wherein the external memory is not on the same die as the on-chip memory system, and wherein rows of X correspond to different data pixels from the input sample and columns of X correspond to different channels;

generating instructions to transfer kernel pixels from multiple kernels from the external memory to the on-chip memory system, wherein rows of Y correspond to different channels and columns of Y correspond to different kernels, but all elements of Y are for a same kernel pixel index.

16. The system of claim 15 further comprising:
a controller external to the mesh of Tiles, the controller configured to execute the instructions to transfer data from the external memory to the on-chip memory system.

17. The system of claim 15 wherein the computer program comprises Tile instructions to perform the matrix multiplications of X×Y=Z in a loop, wherein each iteration of the loop performs X×Y=Z for a different kernel pixel index; and the instructions to transfer data pixels of the input sample from the external memory to the on-chip memory system are scheduled in an order determined by the loop.

18. The system of claim 12 wherein:
the MLA further comprises an on-chip memory system also on the semiconductor die and accessible by the Tiles, the multi-level memory system includes L1 memory, L2 memory and data transfer paths between the L1 memories and between the L1 and L2 memories; and generating the computer program comprise generating Tile instructions for data transfer of data pixels between the L1 and L2 memories, and the compiler statically schedules said Tile instructions.

19. The system of claim 12 wherein the compiler allocates the matrix multiplications among multiple Tiles.

20. The system of claim 12 wherein the compiler allocates all of the matrix multiplications to a single Tile.

* * * * *